(12) United States Patent
Makihara et al.

(10) Patent No.: US 12,344,075 B2
(45) Date of Patent: Jul. 1, 2025

(54) BATTERY HEATING DEVICE FOR VEHICLE

(71) Applicant: DENSO CORPORATION, Kariya (JP)

(72) Inventors: Masamichi Makihara, Kariya (JP); Yoshiki Katoh, Kariya (JP); Takahiro Maeda, Kariya (JP); Kuniyoshi Tanioka, Kariya (JP); Naoki Yokoyama, Kariya (JP)

(73) Assignee: DENSO CORPORATION, Kariya (JP)

( * ) Notice: Subject to any disclaimer, the term of this patent is extended or adjusted under 35 U.S.C. 154(b) by 774 days.

(21) Appl. No.: 17/501,447

(22) Filed: Oct. 14, 2021

(65) Prior Publication Data

US 2022/0032732 A1    Feb. 3, 2022

Related U.S. Application Data

(63) Continuation of application No. PCT/JP2020/016166, filed on Apr. 10, 2020.

(30) Foreign Application Priority Data

Apr. 19, 2019   (JP) .................................. 2019-080065

(51) Int. Cl.
  *B60H 1/00*   (2006.01)
  *B60L 58/27*   (2019.01)
  (Continued)

(52) U.S. Cl.
  CPC ..... *B60H 1/00899* (2013.01); *B60H 1/00278* (2013.01); *B60H 1/00485* (2013.01);
  (Continued)

(58) Field of Classification Search
  CPC ............ B60H 1/00899; B60H 1/00278; B60H 1/00485; B60H 1/00885;
  (Continued)

(56) References Cited

FOREIGN PATENT DOCUMENTS

JP     H10266856 A    10/1998
JP     2002352867 A  * 12/2002   ......... B60H 1/00278
  (Continued)

OTHER PUBLICATIONS

JP-2004072933-A English translation (Year: 2004).*
  (Continued)

*Primary Examiner* — Steven S Anderson, II
*Assistant Examiner* — Kurt J Wolford
(74) *Attorney, Agent, or Firm* — Harness, Dickey & Pierce, P.L.C.

(57) ABSTRACT

A battery heating device includes: a radiator and a heater core arranged in parallel with each other; a battery temperature adjusting unit for heating a battery with a heat medium; a first branch branching the heat medium between the radiator and the heater core; a first confluence where the heat medium merges; a second branch where the heat medium from a heat emitter is branched to the battery temperature adjustment unit; a second confluence where the heat medium flowing through the battery temperature adjustment unit merges; and a radiator flow rate reducing part arranged in a passage for the heat medium from the first branch or the second branch closer to the radiator to the first confluence or the second confluence closer to the radiator via the radiator.

17 Claims, 24 Drawing Sheets

(51) Int. Cl.
*H01M 10/615* (2014.01)
*H01M 10/625* (2014.01)
*H01M 10/6556* (2014.01)
*H01M 10/6562* (2014.01)
*H01M 10/6568* (2014.01)
*H01M 10/6569* (2014.01)
*H01M 10/66* (2014.01)

(52) U.S. Cl.
CPC ......... *B60H 1/00885* (2013.01); *B60L 58/27* (2019.02); *H01M 10/615* (2015.04); *H01M 10/625* (2015.04); *H01M 10/6556* (2015.04); *H01M 10/6562* (2015.04); *H01M 10/6568* (2015.04); *H01M 10/6569* (2015.04); *H01M 10/66* (2015.04); *B60H 2001/00307* (2013.01); *B60H 2001/00928* (2013.01); *B60H 2001/00935* (2013.01); *B60L 2240/545* (2013.01); *H01M 2220/20* (2013.01)

(58) Field of Classification Search
CPC ........... B60H 2001/00307; B60H 2001/00928; B60H 2001/00935; B60L 58/27; B60L 2240/545; H01M 10/615; H01M 10/625; H01M 10/6556; H01M 10/6562; H01M 10/6568; H01M 10/6569; H01M 10/66; H01M 2220/20

See application file for complete search history.

(56) References Cited

FOREIGN PATENT DOCUMENTS

| | | | |
|---|---|---|---|
| JP | 2004072933 A | * | 3/2004 |
| JP | 2015093561 A | * | 5/2015 |
| JP | 6271222 B2 | | 1/2018 |
| JP | 2018058573 A | | 4/2018 |
| WO | WO-2018066276 A1 | * | 4/2018 ............... B60H 1/08 |

OTHER PUBLICATIONS

JP-2015093561-A English translation (Year: 2015).*
WO-2018066276-A1 English translation (Year: 2018).*
JP-2002352867-A English translation (Year: 2002).*

* cited by examiner

IV

V-V

XI–XI

BATTERY HEATING DEVICE FOR VEHICLE

CROSS REFERENCE TO RELATED APPLICATION

The present application is a continuation application of International Patent Application No. PCT/JP2020/016166 filed on Apr. 10, 2020, which designated the U.S. and claims the benefit of priority from Japanese Patent Application No. 2019-080065 filed on Apr. 19, 2019. The entire disclosures of all of the above applications are incorporated herein by reference.

TECHNICAL FIELD

The present disclosure relates to a battery heating device configured to heat a battery for a vehicle.

BACKGROUND

Conventionally, an air conditioner heats a cabin of a vehicle with cooling water heated by a refrigerant in a refrigeration cycle.

SUMMARY

A battery heating device includes: a high-temperature-side radiator and a heater core arranged in parallel with each other; a battery temperature adjusting unit configured to heat a battery with a heat medium; a first branch for the heat medium to branch between the high-temperature-side radiator and the heater core; a first confluence where the heat medium merges; a second branch for the heat medium whose heat is emitted in a heat emitter to branch toward the battery temperature adjustment unit; a second confluence where the heat medium flowing through the battery temperature adjustment unit merges; and a radiator flow rate reducing part arranged in a heat medium passage defined from the first branch or the second branch closer to the high-temperature-side radiator, via the high-temperature-side radiator, to the first confluence or the second confluence closer to the high-temperature-side radiator.

DESCRIPTION OF EMBODIMENT

Figure 1:
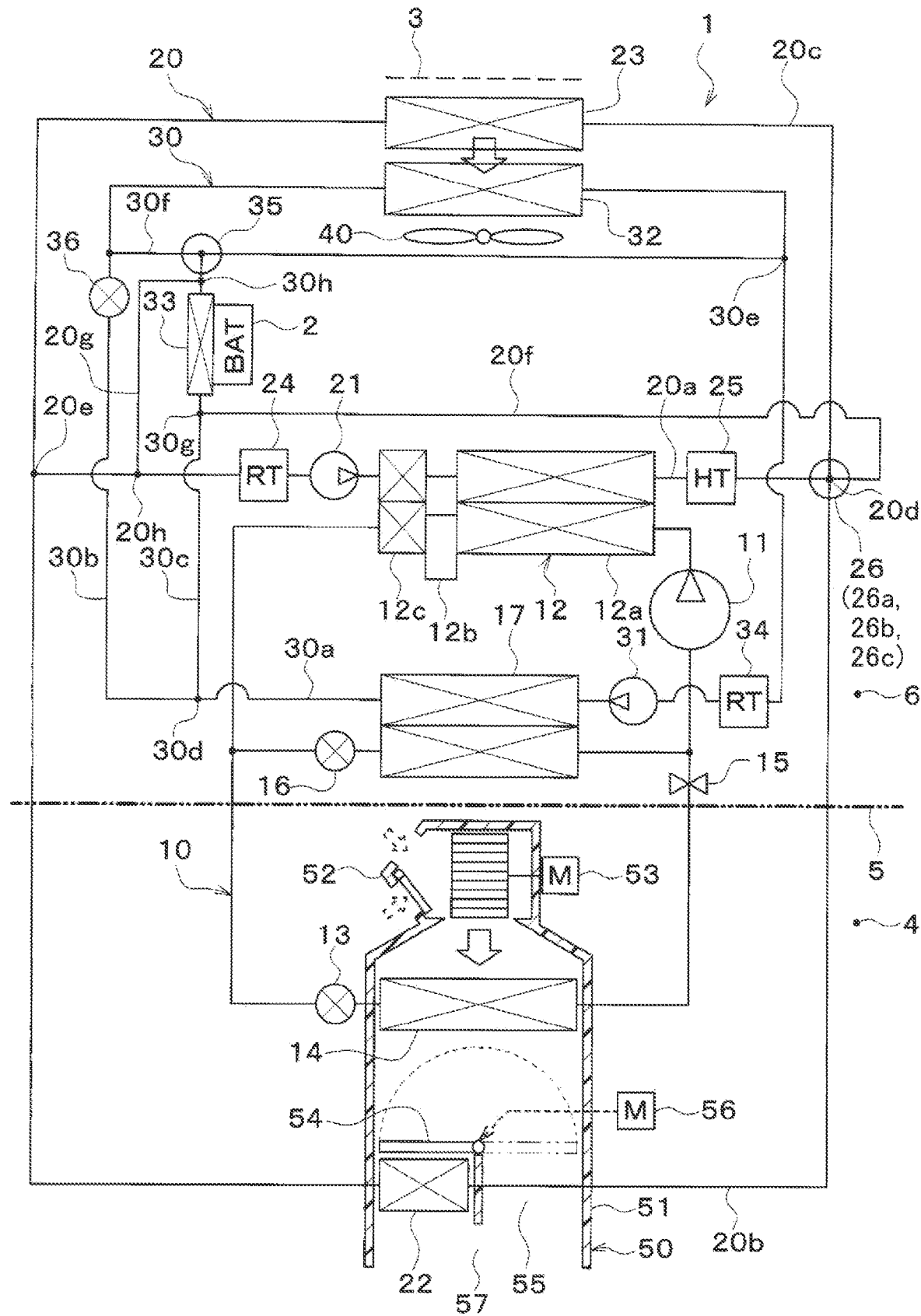
FIG. 1 is an overall configuration diagram of a vehicle temperature control device according to the first embodiment.

Conventionally, a vehicle air conditioner heats a cabin with cooling water heated by a refrigerant in a refrigeration cycle.

A condenser, a heater core and a radiator are arranged in the high-temperature water cycle. The condenser heats the cooling water by exchanging heat between the high-temperature refrigerant in the refrigeration cycle and the cooling water. The heater core heats air by exchanging heat between the cooling water heated by the condenser and the air to be blown into the cabin. The radiator cools the cooling water by exchanging heat between air outside the cabin and the cooling water.

The condenser and the heater core are arranged in the cooling water passage through which the cooling water circulates. The cooling water passage in which the radiator is arranged is connected to the cooling water passage in which the condenser and the heater core are arranged via a three-way valve.

The cooling water passage in which the radiator is arranged is connected to the cooling water passage in which a battery is arranged via a three-way valve. As a result, the battery can also be heated with the cooling water heated by the refrigerant of the refrigeration cycle.

However, when the cooling water heated by the condenser always flows through the heater core, there is a restriction in switching the way of flowing the cooling water to the heater core, the radiator and the battery.

Since there is an increasing need to heat the battery as soon as possible, it is required to efficiently heat the battery while suppressing the heat loss in the heater core and the radiator as small as possible.

The present disclosure provides a battery heating device capable of efficiently heating a battery for a vehicle.

According to the first aspect of the present disclosure, a battery heating device includes a compressor, a heat emitter, a decompressor, an evaporator, a high-temperature-side radiator, a heater core, and a battery temperature adjusting unit, a high-temperature-side first branch, a high-temperature-side first confluence, a high-temperature-side second branch, a high-temperature-side second confluence, a high-temperature-side switching unit, and a high-temperature-side radiator flow rate reducing part.

The compressor draws, compresses, and discharges refrigerant. The heat emitter emits heat of the refrigerant discharged from the compressor to the heat medium. The decompressor decompresses the refrigerant, which flows from the heat emitter after radiating heat. The evaporator evaporates the refrigerant decompressed by the decompressor. The high-temperature-side radiator dissipates heat from the heat medium to outside air at the downstream of the heat emitter. The heater core is arranged in parallel with the high-temperature-side radiator in the flow of the heat medium, and exchanges heat between the air blown into the cabin and the heat medium, to heat the air into the cabin. The battery temperature adjusting unit heats the battery with the heat medium at the downstream of the heat emitter.

In the high-temperature-side first branch, the heat medium branches into the high-temperature-side radiator and the heater core. In the high-temperature-side first confluence, the heat medium flowing through the high-temperature-side radiator and the heat medium flowing through the heater core merge toward the heat emitter. In the high-temperature-side second branch, the heat medium branches toward the battery temperature adjusting unit. At the high-temperature-side second confluence, the heat medium flowing through the battery temperature adjusting unit merges toward the heat emitter. The high-temperature-side switching unit switches the heat medium whose heat is emitted in the heat emitter to flow through the battery temperature adjusting unit or not.

The high-temperature-side radiator flow rate reducing part is arranged in the heat medium passage from the high-temperature-side first branch or the high-temperature-side second branch which is closer to the high-temperature-side radiator, via the high-temperature-side radiator, to the high-temperature-side first confluence or the high-temperature-side second confluence closer to the high-temperature-side radiator, and reduces a flow rate of the heat medium flowing through the high-temperature-side radiator.

Accordingly, the heat medium can be made to flexibly flow to the high-temperature-side radiator, the heater core, and the battery temperature adjusting unit. Then, when the heat medium is passed through the battery temperature adjusting unit to heat the battery, the heat loss in the high-temperature-side radiator can be reduced, so that the battery can be heated efficiently.

According to the second aspect of the present disclosure, the battery heating device includes a compressor, a heat emitter, a decompressor, an evaporator, a battery temperature adjusting unit, a low-temperature-side radiator, a low-temperature-side first branch, a low-temperature-side first confluence, a low-temperature-side second confluence, a low-temperature-side second branch, a low-temperature-side switching unit, and a low-temperature-side radiator flow rate reducing part.

The compressor draws, compresses, and discharges refrigerant. The heat emitter emits heat of the refrigerant discharged from the compressor to the heat medium. The decompressor decompresses the refrigerant, which flows from the heat emitter after radiating heat in the heat emitter. The evaporator causes the refrigerant decompressed by the decompressor to absorb heat from the heat medium to evaporate the refrigerant. The battery temperature adjusting unit adjusts the temperature of the battery by the heat medium whose heat is absorbed by the evaporator or the heat medium whose heat is emitted in the heat emitter. The low-temperature-side radiator is arranged in parallel with the battery temperature adjusting unit in the flow of the heat medium whose heat is absorbed by the evaporator, and exchanges heat between the heat medium and the outside air. The low-temperature-side first branch branches the heat medium whose heat is absorbed by the evaporator into the battery temperature adjusting unit and the low-temperature-side radiator. The low-temperature-side first confluence merges the heat medium flowing through the battery temperature adjusting unit and the heat medium flowing through the low-temperature-side radiator toward the evaporator. The low-temperature-side second confluence merges the heat medium whose heat is radiated by the heat emitter toward the battery temperature adjusting unit. The low-temperature-side second branch branches the heat medium flowing through the battery temperature adjusting unit toward the heat emitter. The low-temperature-side switching unit switches the heat medium whose heat is radiated by the heat emitter to flow through the battery temperature adjusting unit or not.

The low-temperature-side radiator flow reducing part is arranged in the heat medium passage from the low-temperature-side first branch or the low-temperature-side second confluence that is closer to the low-temperature-side radiator, via the low-temperature-side radiator, to the low-temperature-side first confluence or the low-temperature-side second branch closer to the low-temperature-side radiator, and reduces the flow rate of the heat medium flowing through the low-temperature-side radiator.

Accordingly, the heat medium can be made to flexibly flow to the battery temperature adjusting unit and the low-temperature-side radiator. When the heat medium whose heat is radiated by the heat emitter is passed through the battery temperature adjusting unit to heat the battery, the heat loss in the low-temperature-side radiator can be reduced, so that the battery can be heated efficiently.

According to the third aspect of the present disclosure, the battery heating device includes a compressor, a heat emitter, a decompressor, an evaporator, a high-temperature-side radiator, a heater core, and a battery temperature adjusting unit, a heat emitter passage, a heater core passage, a high-temperature-side radiator passage, a battery inlet side passage, and a high-temperature-side four-way valve.

The compressor draws, compresses, and discharges refrigerant. The heat emitter emits heat of the refrigerant discharged from the compressor to the heat medium. The decompressor decompresses the refrigerant, which flows from the heat emitter after radiating heat in the heat emitter. The evaporator evaporates the refrigerant decompressed by the decompressor. The high-temperature-side radiator dissipates heat from the heat medium whose heat is radiated by the heat emitter to the outside air. The heater core is arranged in parallel with the high-temperature-side radiator in the flow of the heat medium whose heat is radiated by the heat emitter, and exchanges heat between the air blown into the cabin and the heat medium whose heat is radiated by the heat emitter, so as to heat the air into the cabin. The battery temperature adjusting unit heats the battery with the heat medium whose heat is radiated by the heat emitter.

The heat emitter passage is a passage through which the heat medium whose heat is radiated by the heat emitter flows. The heater core passage is a passage that branches from the heat emitter passage and allows the heat medium to flow toward the heater core. The high-temperature-side radiator passage is a passage that branches from the heat emitter passage and allows the heat medium to flow toward the high-temperature-side radiator. The battery inlet side passage is a passage that branches from the heat emitter passage and allows the heat medium to flow toward the battery temperature adjusting unit.

The high-temperature-side four-way valve is connected to the heat emitter passage, the heater core passage, the high-temperature-side radiator passage, and the battery inlet side passage. The high-temperature-side four-way valve controls the flow rate of the heat medium flowing from the heat emitter passage to the heater core passage, the flow rate of the heat medium flowing from the heat emitter passage to the high-temperature-side radiator, and the flow rate of the heat medium flowing from the heat emitter passage to the battery inlet side passage.

Accordingly, the same effects as that of the first aspect can be obtained.

Hereinafter, embodiments for implementing the present disclosure will be described referring to drawings. In each embodiment, portions corresponding to those described in the preceding embodiment are denoted by the same reference numerals, and overlapping descriptions may be omitted. In a case where only a part of a configuration is described in each embodiment, the other embodiments described above are capable of being applied for the other parts of the configuration. Not only a combination of parts that clearly indicate that the combination is possible in each embodiment, but also a partial combination of embodiments even if the combination is not specified is also possible when there is no problem in the combination.

First Embodiment

Figure 2:
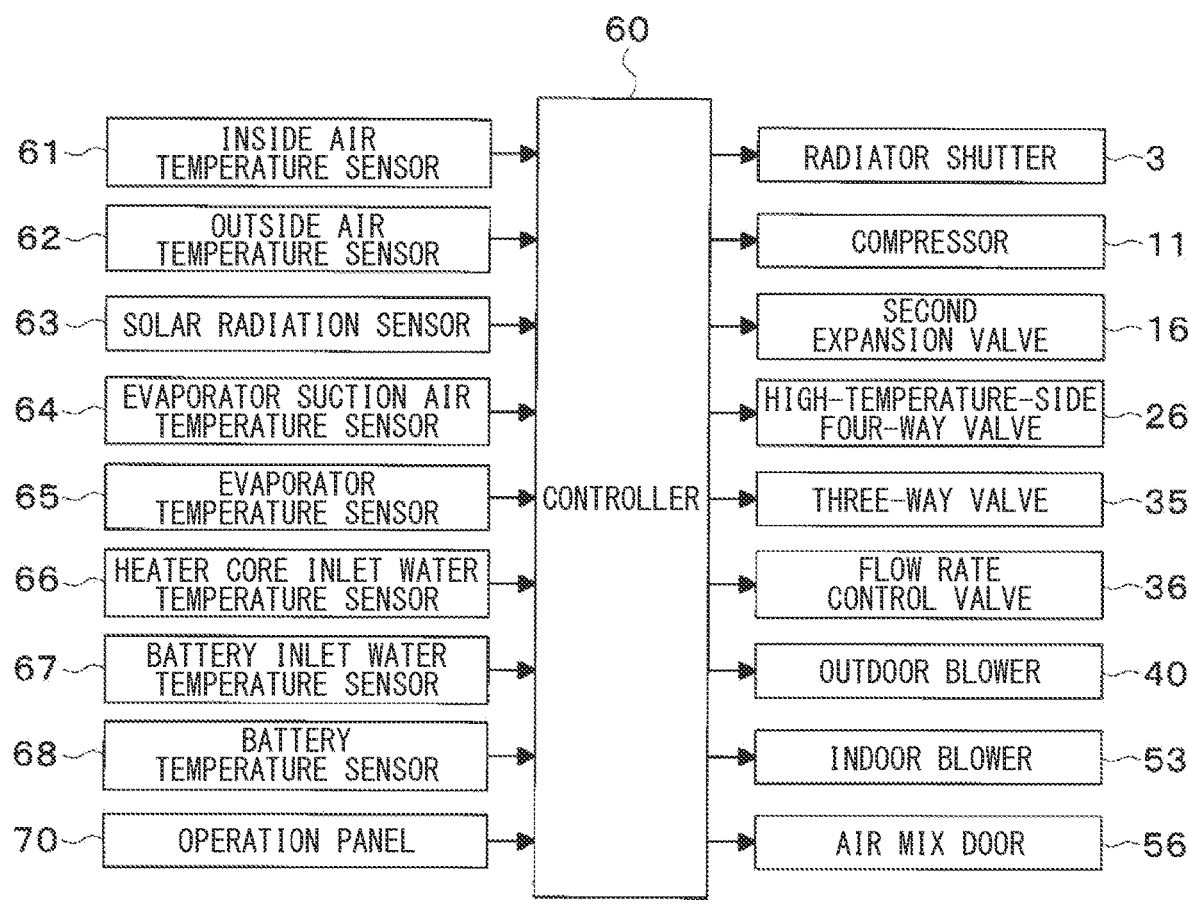
FIG. 2 is a block diagram illustrating an electric control unit of the vehicle temperature control device according to the first embodiment.

A vehicle temperature control device 1 of this embodiment is shown in FIGS. 1 and 2. The vehicle temperature control device 1 includes an air conditioner that adjusts the cabin space (in other words, the space subject to air-conditioning) to have an appropriate temperature. The vehicle temperature control device 1 is also a vehicle battery temperature control device that adjusts the battery 2 to an appropriate temperature. The vehicle temperature control device 1 is also a vehicle battery cooling device that cools the battery 2. The vehicle temperature control device 1 is also a vehicle battery heating device that heats the battery 2.

In this embodiment, the vehicle temperature control device 1 is applied to an electric vehicle that obtains a driving force for traveling from an electric motor. The electric vehicle of the present embodiment is capable of charging the battery 2 (i.e., on-vehicle battery) mounted on the vehicle with electric power supplied from an external electric power source (i.e., commercial power source) when the vehicle is stopped. As the battery 2, for example, a lithium-ion battery can be used.

The electric power stored in the battery is supplied not only to the electric motor but also to various electric devices of the vehicle temperature control device 1 and various in-vehicle devices.

The vehicle temperature control device 1 includes a refrigeration cycle device 10 which is a vapor compression type refrigerator including a compressor 11, a condenser 12, a first expansion valve 13, an air-side evaporator 14, a constant pressure valve 15, a second expansion valve 16, and a cooling-water-side evaporator 17. The refrigerant of the refrigeration cycle device 10 is a chlorofluorocarbon-based refrigerant. The refrigeration cycle device 10 is a subcritical refrigeration cycle in which the pressure of the refrigerant on the high pressure side does not exceed the critical pressure of the refrigerant.

The second expansion valve 16 and the cooling-water-side evaporator 17 are disposed in parallel with the first expansion valve 13, the air-side evaporator 14, and the constant pressure valve 15 in the refrigerant flow.

The refrigeration cycle device 10 has a first refrigerant circulation circuit and a second refrigerant circulation circuit. In the first refrigerant circulation circuit, the refrigerant circulates in order of the compressor 11, the condenser 12, the first expansion valve 13, the air-side evaporator 14, the constant pressure valve 15, and the compressor 11. In the second refrigerant circulation circuit, the refrigerant circulates in order of the compressor 11, the condenser 12, the second expansion valve 16, and the cooling-water-side evaporator 17.

The compressor 11 is an electric compressor driven by electric power supplied from a battery and sucks, compresses, and discharges the refrigerant of the refrigeration cycle device 10. The electric motor of the compressor 11 is controlled by a controller 60. The compressor 11 may be a variable displacement compressor driven by a belt.

The condenser 12 is a high-pressure-side heat exchanger for exchanging heat between the high-pressure-side refrigerant discharged from the compressor 11 and the cooling water of a high-temperature cooling water circuit 20.

The condenser 12 has a condensing section 12a, a receiver 12b, and a supercooling section 12c. The condensing section 12a exchanges heat between the high-pressure-side refrigerant discharged from the compressor 11 and the cooling water of the high-temperature cooling water circuit 20 to condense the high-pressure-side refrigerant. The condenser 12 is a heat emitter that emits heat of the refrigerant discharged from the compressor 11 to the cooling water.

The cooling water of the high-temperature cooling water circuit 20 is fluid as a heat medium. The cooling water of the high-temperature cooling water circuit 20 is a high-temperature heat medium. In the present embodiment, a liquid containing at least ethylene glycol, dimethylpolysiloxane, or nanofluid, or an antifreeze liquid is used as the cooling water of the high-temperature cooling water circuit 20. The high-temperature cooling water circuit 20 is a high-temperature heat medium circuit in which a high-temperature heat medium circulates.

The receiver 12b is a gas-liquid separation part that separates the high-pressure refrigerant flowing out of the condenser 12 into gas and liquid, and allows the separated liquid-phase refrigerant to flow out to the downstream side while storing the excess refrigerant in the cycle.

The supercooling section 12c exchanges heat between the liquid-phase refrigerant flowing out of the receiver 12b and the cooling water of the high-temperature cooling water circuit 20 to supercool the liquid-phase refrigerant.

The first expansion valve 13 is a first decompressor that depressurizes and expands the liquid phase refrigerant flowing out of the receiver 12b. The first expansion valve 13 is a mechanical thermal expansion valve. The mechanical expansion valve is a thermal expansion valve having a temperature sensor and driving a valve body by using a mechanical mechanism such as a diaphragm. The first expansion valve 13 may be an electric expansion valve.

The air-side evaporator 14 exchanges heat between the refrigerant flowing out of the first expansion valve 13 and the air blown into the cabin to evaporate the refrigerant. In the air-side evaporator 14, the refrigerant absorbs heat from the air blown into the cabin. The air-side evaporator 14 is an air cooler for cooling the air blown into the cabin.

The constant pressure valve 15 is a pressure regulator for maintaining the pressure of the refrigerant at the outlet side of the air-side evaporator 14 at a predetermined value. The constant pressure valve 15 includes a mechanical or electric variable throttle mechanism. Specifically, the constant pressure valve 15 decreases a passage area (i.e., throttle opening) of a refrigerant passage when the pressure of the refrigerant on the outlet side of the air-side evaporator 14 falls below a predetermined value. When the pressure of the refrigerant on the outlet side of the air-side evaporator 14 exceeds the predetermined value, the constant pressure valve 15 increases the passage area (i.e., throttle opening) of the refrigerant passage. The vapor phase refrigerant with its pressure regulated by the constant pressure valve 15 is sucked into the compressor 11 and compressed.

For example, when variations in the flow rate of the refrigerant that circulates in the cycle are small, a fixed throttle such as an orifice or a capillary tube may be adopted, instead of the constant pressure valve 15.

The second expansion valve 16 is a second decompressor for depressurizing and expanding the liquid-phase refrigerant flowing out of the condenser 12. The second expansion valve 16 is an electric expansion valve. The electric expansion valve is an electric variable throttle mechanism including a valve body whose throttle opening is variable and an electric actuator for changing the opening of the valve body. The second expansion valve 16 can fully close a refrigerant passage.

The second expansion valve 16 is a refrigerant flow switching unit for switching between a state in which refrigerant flows in the air-side evaporator 14 and a state in which refrigerant flows in both the air-side evaporator 14 and the cooling-water-side evaporator 17.

The operation of the second expansion valve 16 is controlled by a control signal output from the controller 60. The second expansion valve 16 may be a mechanical temperature expansion valve. When the second expansion valve 16 is a mechanical temperature expansion valve, an on-off valve for opening or closing the refrigerant passage for the second expansion valve 16 needs to be provided separately from the second expansion valve 16.

The cooling-water-side evaporator 17 exchanges heat between the refrigerant flowing out of the second expansion valve 16 and the cooling water of a low-temperature cooling water circuit 30 to evaporate the refrigerant. In the cooling-water-side evaporator 17, the refrigerant absorbs heat from the cooling water of the low-temperature cooling water circuit 30. The cooling-water-side evaporator 17 is a heat medium cooler for cooling the cooling water of the low-temperature cooling water circuit 30. A vapor phase refrigerant evaporated by the cooling-water-side evaporator 17 is sucked into the compressor 11 and compressed.

The cooling water of the low-temperature cooling water circuit 30 is fluid as a heat medium. The cooling water of the low-temperature cooling water circuit 30 is a low-temperature heat medium. In the present embodiment, a liquid containing at least ethylene glycol, dimethylpolysiloxane, or nanofluid, or an antifreeze liquid is used as the cooling water of the low-temperature cooling water circuit 30. The low-temperature cooling water circuit 30 is a low-temperature heat medium circuit in which the low-temperature heat medium circulates.

In the high-temperature cooling water circuit 20, a condenser 12, a high-temperature-side pump 21, a heater core 22, a high-temperature-side radiator 23, a high-temperature-side reserve tank 24, an electric heater 25, and a high-temperature-side four-way valve 26 are arranged.

The high-temperature-side pump 21 is a heat medium pump for sucking and discharging cooling water. The high-temperature-side pump 21 is an electric pump in which the discharge flow rate is constant. The high-temperature-side pump 21 may be an electric pump having a variable discharge flow rate.

The heater core 22 is an air heater that exchanges heat between the cooling water of the high-temperature cooling water circuit 20 and the air blown into the cabin to heat the air blown into the cabin. In the heater core 22, cooling water radiates heat to the air blown into the cabin.

The high-temperature-side radiator 23 is a heat exchanger that exchanges heat between the cooling water of the high-temperature cooling water circuit 20 and the outside air to dissipate heat from the cooling water to the outside air.

The high-temperature-side reserve tank 24 is a cooling water storage part for storing excess cooling water. It is possible to restrict decrease in the amount of the cooling water circulating in each passage by storing the excess cooling water in the high-temperature-side reserve tank 24.

The high-temperature-side reserve tank 24 has a function of separating gas and liquid of cooling water. The high-temperature-side reserve tank 24 has a function of separating air (that is, air bubbles) contained in the cooling water.

The high-temperature-side reserve tank 24 is a closed type reserve tank. The air separated in the high-temperature-side reserve tank 24 is stored in the high-temperature-side reserve tank 24. The pressure at the liquid level of the cooling water stored in the high-temperature-side reserve tank 24 is adjusted by utilizing the compressibility of the air stored in the high-temperature-side reserve tank 24.

The electric heater 25 is a heating unit that generates heat when electric power is supplied to heat the cooling water of the high-temperature cooling water circuit 20. The electric heater 25 is a heat generating unit capable of generating heat independently of the traveling state of the vehicle.

The condenser 12, the high-temperature-side pump 21, the high-temperature-side reserve tank 24, and the electric heater 25 are arranged in the condenser passage 20a. The condenser passage 20a is a passage through which the cooling water of the high-temperature cooling water circuit 20 flows. The condenser passage 20a is a heat emitter passage through which the cooling water flows after the heat is emitted by the condenser 12.

The high-temperature-side reserve tank 24, the high-temperature-side pump 21, the condenser 12, and the electric heater 25 are arranged in this order in the flow direction of the cooling water in the condenser passage 20a.

The heater core 22 is arranged in the heater core passage 20b. The heater core passage 20b is a passage through which the cooling water of the high-temperature cooling water circuit 20 flows.

The high-temperature-side radiator 23 is arranged in the high-temperature-side radiator passage 20c. The high-temperature-side radiator passage 20c is a passage through which the cooling water of the high-temperature cooling water circuit 20 flows in parallel with the heater core passage 20b.

The heater core passage 20b and the high-temperature-side radiator passage 20c are connected to the condenser passage 20a in parallel with each other.

The heater core 22 and the high-temperature-side radiator 23 are arranged in parallel with each other in the flow of the cooling water of the high-temperature cooling water circuit 20.

The heater core passage 20b and the high-temperature-side radiator passage 20c are branched from the condenser passage 20a at the high-temperature-side first branch 20d. In the high-temperature-side first branch 20d, the cooling water flowing from the condenser 12 branches between the high-temperature-side radiator passage 20c and the heater core 22.

The heater core passage 20b and the high-temperature-side radiator passage 20c join the condenser passage 20a at the high-temperature-side first confluence 20e. In the high-temperature-side first confluence 20e, the cooling water flowing through the high-temperature-side radiator passage 20c and the cooling water flowing through heater core 22 merge toward the condenser 12.

The high-temperature-side four-way valve 26 is arranged at the high-temperature-side first branch 20d. The high-temperature-side four-way valve 26 is an electric valve that opens and closes the heater core passage 20b and the high-temperature-side radiator passage 20c.

The battery inlet side passage 20f is connected to the high-temperature-side four-way valve 26. The high-temperature-side first branch 20d is also a high-temperature-side second branch where the cooling water flowing from the condenser 12 branches toward the battery heat exchanger 33.

The high-temperature-side four-way valve 26 has a high-temperature-side switching unit 26a that switches between a state in which the cooling water from the condenser 12 flows through the battery heat exchanger 33 and a state in which the cooling water does not flow. The high-temperature-side four-way valve 26 adjusts the flow rate of the cooling water of the high-temperature cooling water circuit 20 flowing into the battery inlet side passage 20f.

The high-temperature-side four-way valve 26 has one cooling water inlet and three cooling water outlets. The high-temperature-side four-way valve 26 adjusts the opening areas of the heater core passage 20b and the high-temperature-side radiator passage 20c. The high-temperature-side four-way valve 26 has a heater core flow rate reducing part 26b that adjusts the flow rate of the cooling water of the high-temperature cooling water circuit 20 flowing into the heater core passage 20b. The high-temperature-side four-way valve 26 has a high-temperature-side radiator flow ratio reducing part 26c that adjusts a ratio of the flow rate of the cooling water of the high-temperature cooling water circuit 20 flowing into the high-temperature-side radiator passage 20c relative to the flow rate of the cooling water whose heat is emitted in the condenser 12. The operation of the high-temperature-side four-way valve 26 is controlled by the controller 60.

The high-temperature-side four-way valve 26 opens and closes the heater core passage 20b, the high-temperature-side radiator passage 20c, and the battery inlet side passage 20f. The high-temperature-side four-way valve 26 adjusts the opening areas of the heater core passage 20b, the high-temperature-side radiator passage 20c, and the battery inlet side passage 20f.

The high-temperature-side four-way valve 26 adjusts the ratio of the amount of the cooling water flowing through the heater core 22 and the amount of the cooling water flowing through the high-temperature-side radiator 23.

The battery outlet side passage 20g is connected to the high-temperature-side second confluence 20h of the condenser passage 20a. The high-temperature-side second confluence 20h is arranged at the cooling water inlet side of the high-temperature-side reserve tank 24 in the condenser passage 20a. At the high-temperature-side second confluence 20h, the cooling water flowing through the battery heat exchanger 33 merges toward the condenser 12.

The high-temperature-side four-way valve 26 is one valve device configured to open and close the cooling water passage for the battery heat exchanger 33 and adjust the opening degree of the cooling water passage for the high-temperature-side radiator 23 and the opening degree of the cooling water passage for the heater core 22.

Figure 3:
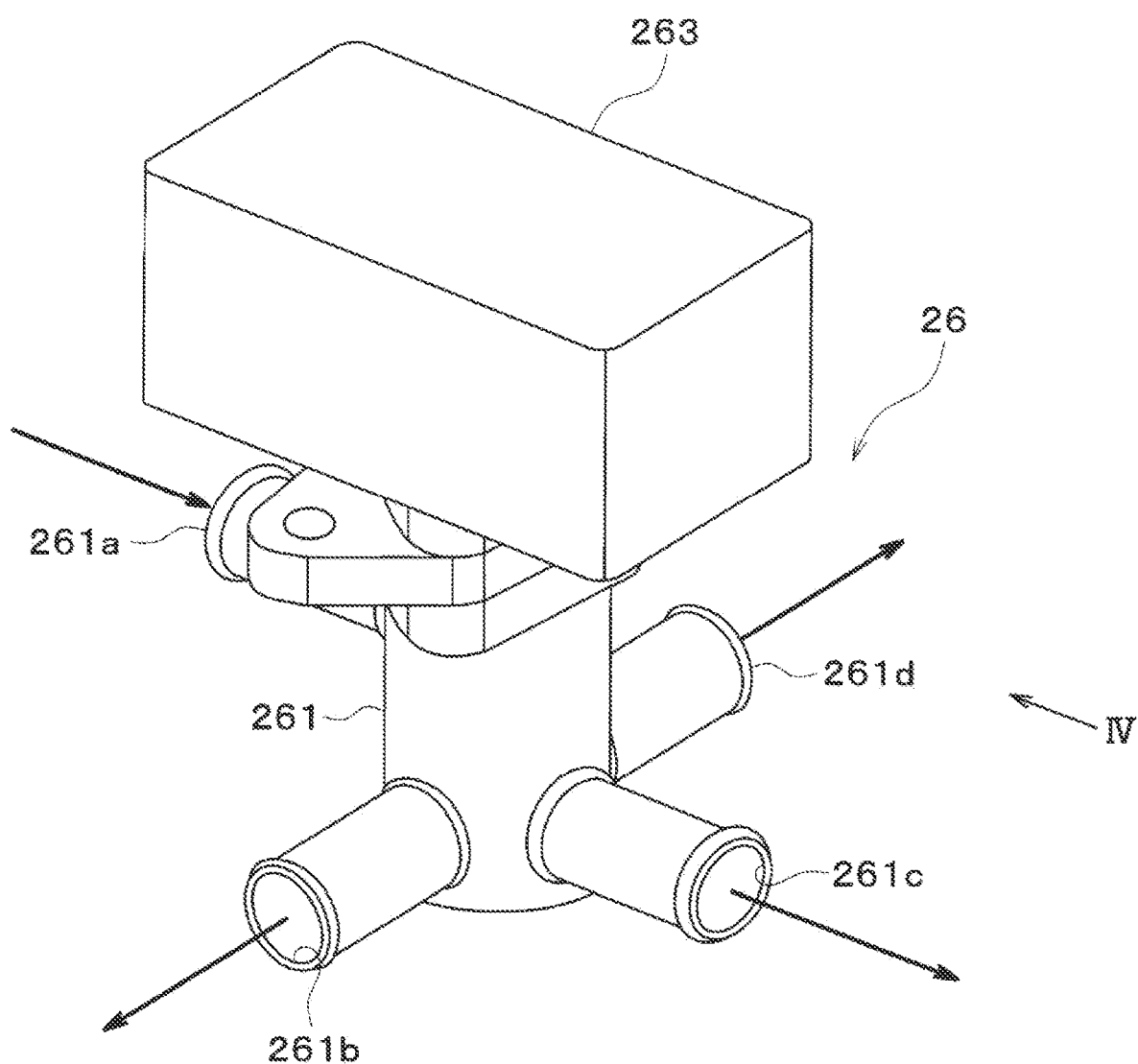
FIG. 3 is a perspective view illustrating a high-temperature-side four-way valve of the vehicle temperature control device according to the first embodiment.
Figure 4:
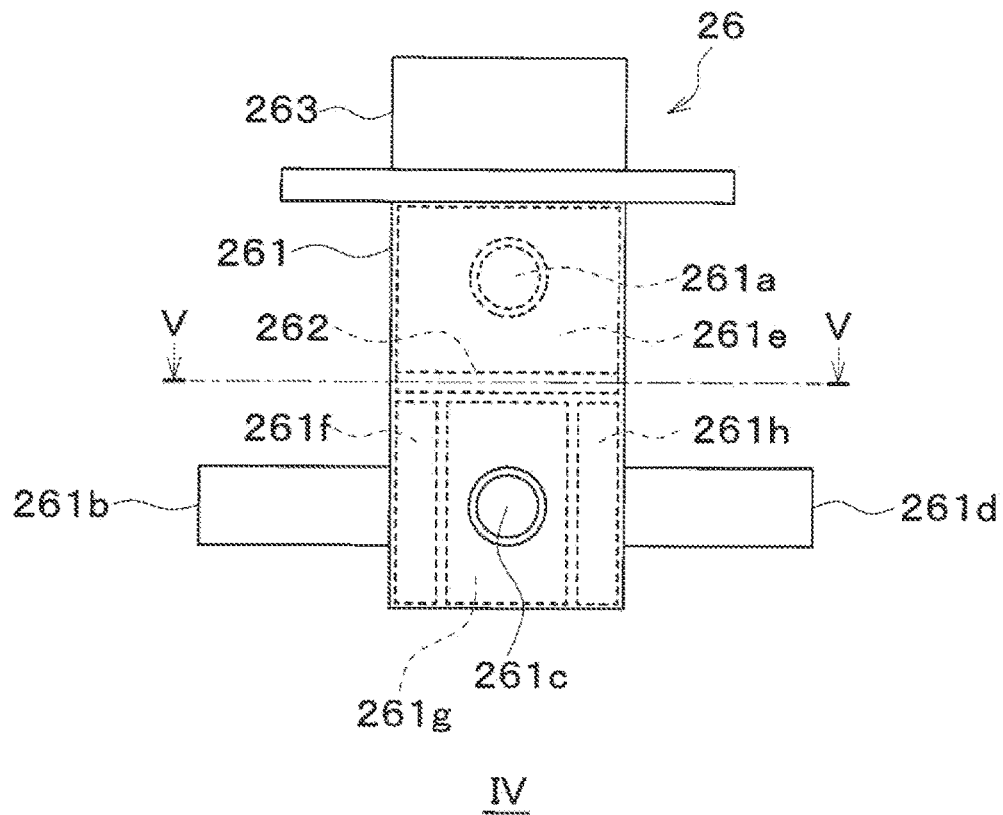
FIG. 4 is a side view seen in an arrow direction IV of FIG. 3.

As shown in FIGS. 3 and 4, the high-temperature-side four-way valve 26 has a housing 261, a valve body 262, and an actuator 263. The housing 261 has a cooling water inlet 261a, a radiator side outlet 261b, a heater core side outlet 261c, and a battery side outlet 261d.

The cooling water inlet 261a is an inlet for the heat medium. The cooling water inlet 261a is connected to the condenser passage 20a. The radiator side outlet 261b is connected to the high-temperature-side radiator passage 20c. The heater core side outlet 261c is connected to the heater core passage 20b. The battery side outlet 261d is connected to the battery inlet side passage 20f.

A cooling water inlet space 261e, a radiator side space 261f, a heater core side space 261g, and a battery side space 261h are formed inside the housing 261.

The cooling water inlet space 261e is an inlet space for the heat medium. The cooling water inlet space 261e communicates with the cooling water inlet 261a. The radiator side space 261f communicates with the radiator side outlet 261b. The heater core side space 261g communicates with the heater core side outlet 261c. The battery side space 261h communicates with the battery side outlet 261d.

Each of the radiator side space 261f, the heater core side space 261g, and the battery side space 261h communicates with the cooling water inlet space 261e.

Figure 5:
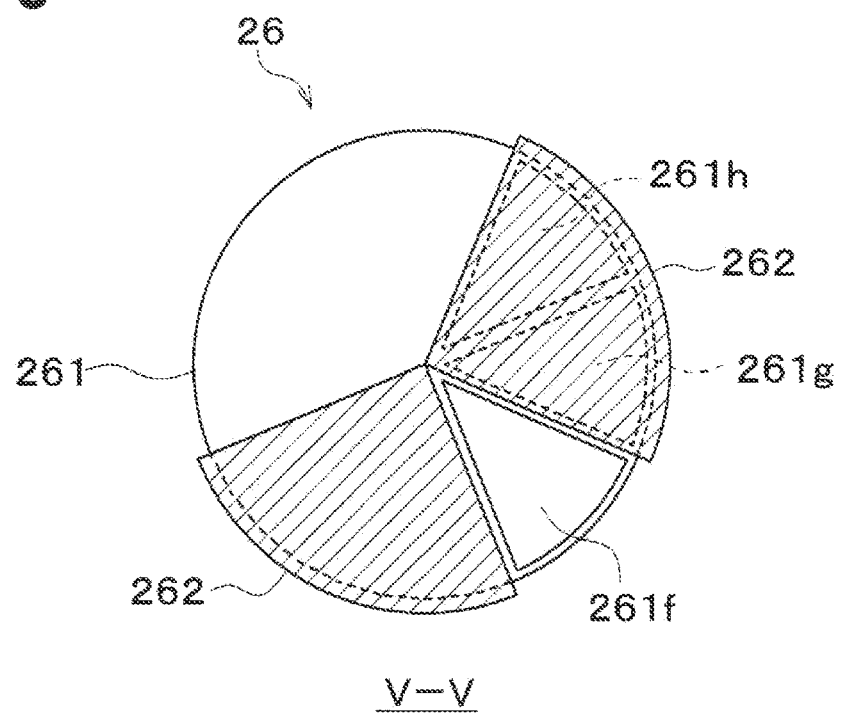
FIG. 5 is a schematic cross-sectional view taken along a line V-V of FIG. 4, illustrating an operating state of the high-temperature-side four-way valve in a cooling/battery cooling mode of the first embodiment.

As shown in FIG. 5, the heater core side space 261g is located between the radiator side space 261f and the battery side space 261h.

The valve body 262 opens and closes the radiator side space 261f, the heater core side space 261g, and the battery side space 261h, to change the communication state of the cooling water inlet space 261e relative to the radiator side space 261f, the heater core side space 261g, the battery side space 261h.

The valve body 262 is rotationally operated by the rotational driving force of the actuator 263. The operation of the actuator 263 is controlled by the controller 60.

FIG. 5 shows the operating state of the high-temperature-side four-way valve 26 in the cooling/battery cooling mode. In the operating state of FIG. 5, the valve body 262 opens the radiator side space 261f, closes the heater core side space 261g, and closes the battery side space 261h.

Figure 6:
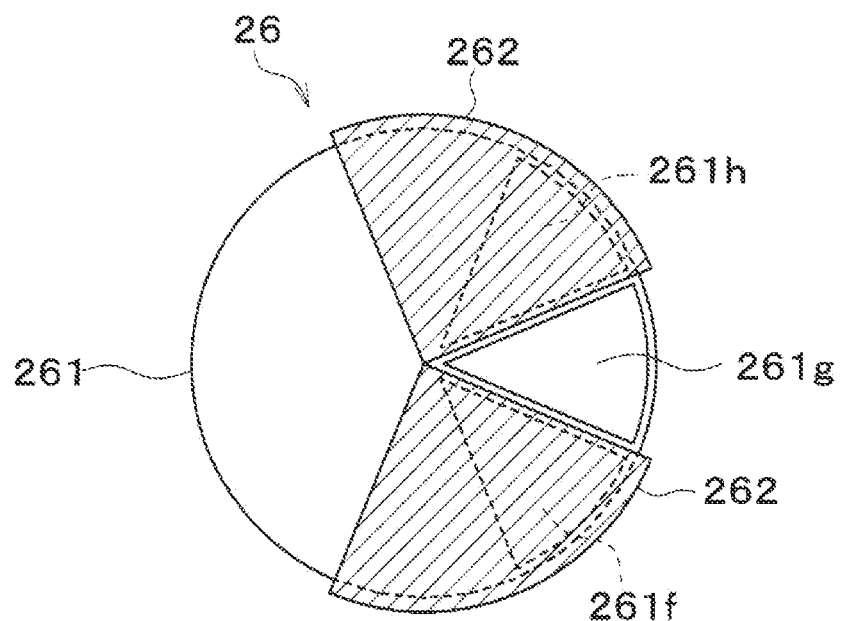
FIG. 6 is a schematic view illustrating an operating state of the high-temperature-side four-way valve in a heating mode of the first embodiment.

FIG. 6 shows the operating state of the high-temperature-side four-way valve 26 in the heating mode. In the operating state of FIG. 6, the valve body 262 closes the radiator side space 261f, opens the heater core side space 261g, and closes the battery side space 261h.

Figure 7:
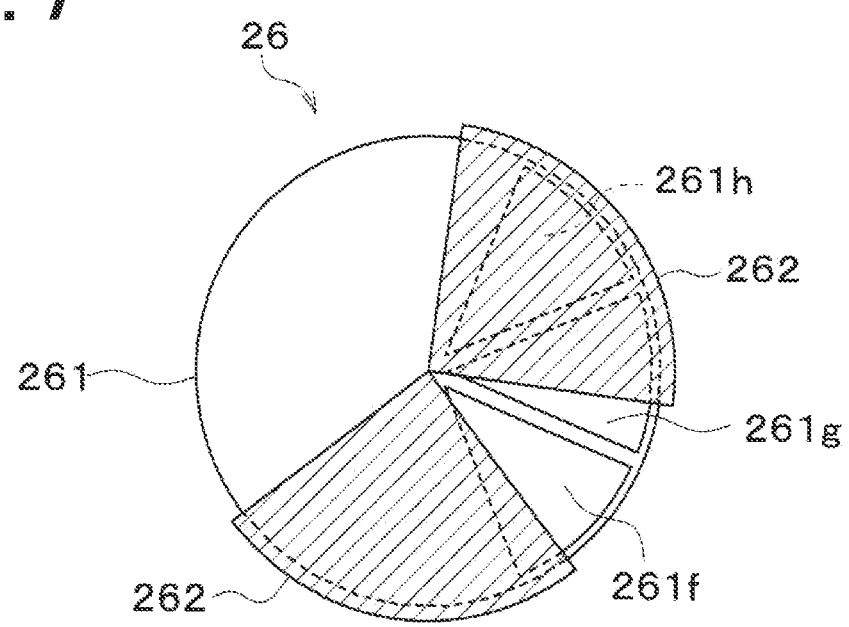
FIG. 7 is a schematic view illustrating an operating state of the high-temperature-side four-way valve in a dehumidifying heating mode of the first embodiment.

FIG. 7 shows the operating state of the high-temperature-side four-way valve 26 in the dehumidifying heating mode. In the operating state of FIG. 7, the valve body 262 is rotated so as to open the radiator side space 261f, open the heater core side space 261g, and close the battery side space 261h.

Figure 8:
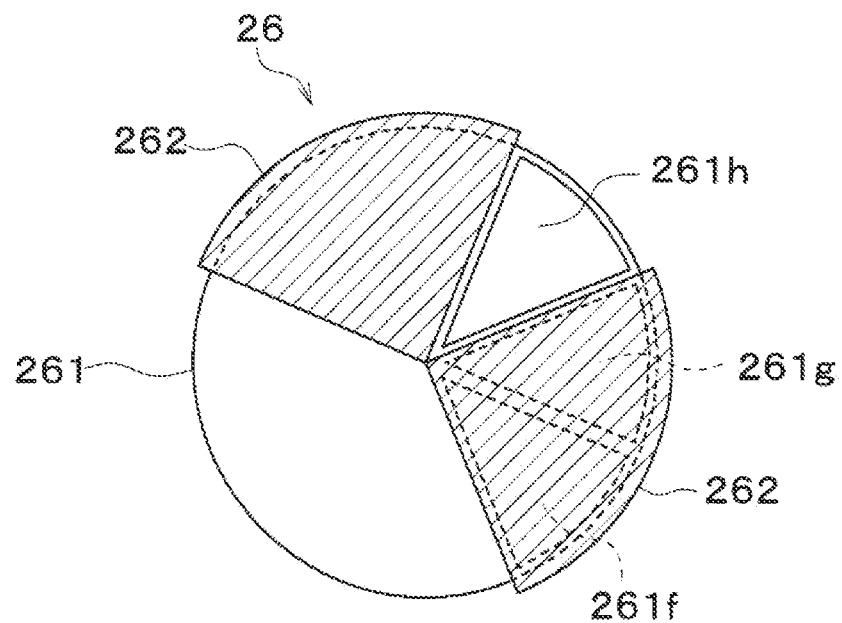
FIG. 8 is a schematic view illustrating an operating state of the high-temperature-side four-way valve in a battery heating mode of the first embodiment.

FIG. 8 shows the operating state of the high-temperature-side four-way valve 26 in the battery heating mode. In the operating state of FIG. 8, the valve body 262 closes the radiator side space 261f, closes the heater core side space 261g, and opens the battery side space 261h.

Figure 9:
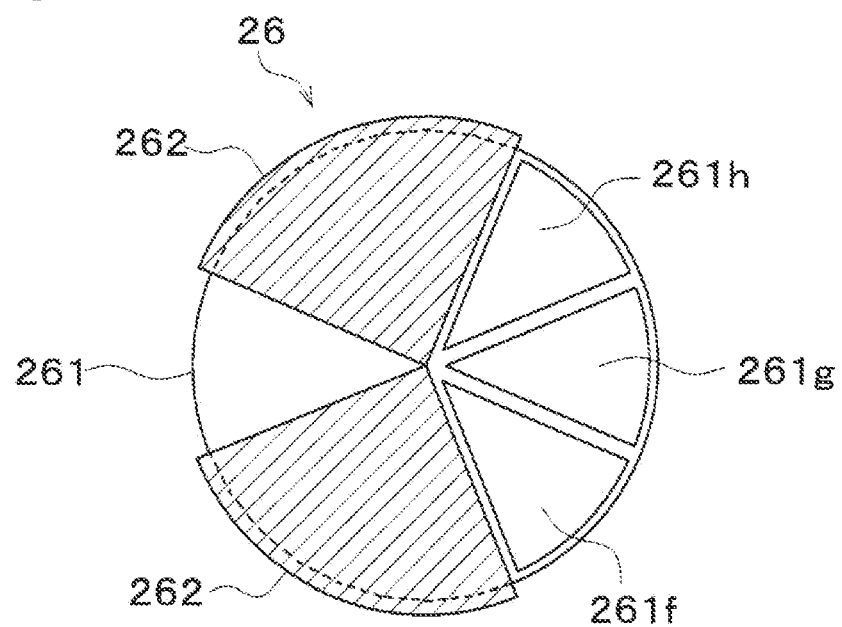
FIG. 9 is a schematic view illustrating an operating state of the high-temperature-side four-way valve in an injection mode of the first embodiment.

FIG. 9 shows the operating state of the high-temperature-side four-way valve 26 in the water injection mode. In the operating state of FIG. 9, the valve body 262 opens the radiator side space 261f, the heater core side space 261g, and the battery side space 261h.

As shown in FIG. 1, a low-temperature-side pump 31, a cooling-water-side evaporator 17, a low-temperature-side radiator 32, a battery heat exchanger 33, and a low-temperature-side reserve tank 34 are arranged in the low-temperature cooling water circuit 30.

The low-temperature-side pump 31 is a heating medium pump for sucking and discharging cooling water. The low-temperature-side pump 31 is an electric pump.

The low-temperature-side radiator 32 is a heat absorber that exchanging heat between the cooling water of the low-temperature cooling water circuit 30 and the outside air to absorb heat from the outside air into the cooling water of the low-temperature cooling water circuit 30.

The high-temperature-side radiator 23 and the low-temperature-side radiator 32 are disposed in series in this order in the flow direction of the outside air. Outside air is blown to the high-temperature-side radiator 23 and the low-temperature-side radiator 32 by an outdoor blower 40.

The outdoor blower 40 is an air blowing part for blowing outside air toward the high-temperature-side radiator 23 and the low-temperature-side radiator 32. The outdoor blower 40 is an electric blower in which the fan is driven by an electric motor. The operation of the outdoor blower 40 is controlled by the controller 60.

The high-temperature-side radiator 23, the low-temperature-side radiator 32, and the outdoor blower 40 are disposed in the foremost portion of the vehicle. Accordingly, during the traveling of the vehicle, the wind can be applied to the high-temperature-side radiator 23 and the low-temperature-side radiator 32.

A radiator shutter 3 is arranged on the front surface of the high-temperature-side radiator 23 and the low-temperature-side radiator 32. When the radiator shutter 3 is closed, it is possible to restrict the wind from being applied to the high-temperature-side radiator 23 and the low-temperature-side radiator 32 while the vehicle is traveling. The operation of the radiator shutter 3 is controlled by the controller 60.

The battery 2 and the battery heat exchanger 33 are arranged so that heat can be conducted. The battery heat exchanger 33 is a battery temperature adjusting unit that adjusts the temperature of the battery 2 with cooling water. The battery heat exchanger 33 dissipates the waste heat generated from the battery 2 to the cooling water of the low-temperature cooling water circuit 30. The battery heat exchanger 33 causes the battery 2 to absorb heat from the cooling water of the low-temperature cooling water circuit 30.

The low-temperature-side reserve tank 34 is a cooling water storage part for storing excess cooling water. It is possible to restrict decrease in the amount of the cooling water circulating in each passage by storing the excess cooling water in the low-temperature-side reserve tank 34.

The low-temperature-side reserve tank 34 has a function of separating gas and liquid of cooling water. The low-temperature-side reserve tank 34 has a function of separating air (that is, air bubbles) contained in the cooling water.

The low-temperature-side reserve tank 34 is a closed type reserve tank. The air separated in the low-temperature-side reserve tank 34 is stored in the low-temperature-side reserve tank 34. The pressure at the liquid level of the cooling water stored in the low-temperature-side reserve tank 34 is adjusted by utilizing the compressibility of the air stored in the low-temperature-side reserve tank 34.

The low-temperature-side pump 31, the cooling-water-side evaporator 17, and the low-temperature-side reserve tank 34 are arranged in the evaporator passage 30a. The evaporator passage 30a is a passage through which the cooling water of the low-temperature cooling water circuit 30 flows.

The low-temperature-side reserve tank 34, the low-temperature-side pump 31, and the cooling-water-side evaporator 17 are arranged in this order in the flow direction of the cooling water in the evaporator passage 30a.

The low-temperature-side radiator 32 is arranged in the low-temperature-side radiator passage 30b. The low-temperature-side radiator passage 30b is a passage through which the cooling water of the low-temperature cooling water circuit 30 flows.

The battery heat exchanger 33 is arranged in the battery passage 30c. The battery passage 30c is a passage through which the cooling water of the low-temperature cooling water circuit 30 flows. The battery passage 30c is a battery temperature control unit passage through which cooling water flows toward the battery heat exchanger 33, which is a battery temperature control unit.

The low-temperature-side radiator passage 30b and the battery passage 30c are branched from the evaporator passage 30a at the low-temperature-side first branch 30d. At the low-temperature-side first branch 30d, the cooling water whose heat is absorbed by the cooling-water-side evaporator 17 branches between the battery heat exchanger 33 and the low-temperature-side radiator 32.

The low-temperature-side radiator passage 30b and the battery passage 30c join the evaporator passage 30a at the low-temperature-side first confluence 30e. In the low-temperature-side first confluence 30e, the cooling water flowing through the battery heat exchanger 33 and the cooling water flowing through the low-temperature-side radiator 32 merge toward the cooling-water-side evaporator 17.

The battery radiator passage 30f connects the cooling water outlet side of the battery heat exchanger 33 in the battery passage 30c to the cooling water inlet side of the low-temperature-side radiator 32 in the low-temperature-side radiator passage 30b. The battery radiator passage 30f is a passage through which the cooling water of the low-temperature cooling water circuit 30 flows.

A three-way valve 35 is disposed in the low-temperature cooling water circuit 30. The three-way valve 35 is arranged at the connection between the battery passage 30c and the battery radiator passage 30f. The three-way valve 35 switches the cooling water flowing out of the battery heat exchanger 33 to flow directly through the battery passage 30c and flow into the evaporator passage 30a, or to flow through the battery radiator passage 30f and flow into the low-temperature-side radiator passage 30b.

Figure 10:
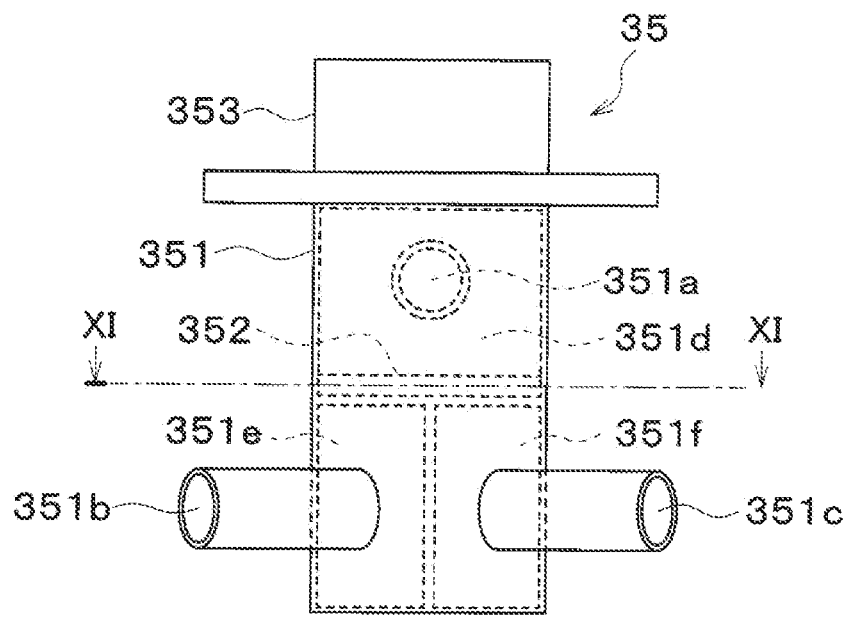
FIG. 10 is a front view illustrating a three-way valve of the vehicle temperature control device according to the first embodiment.
Figure 11:
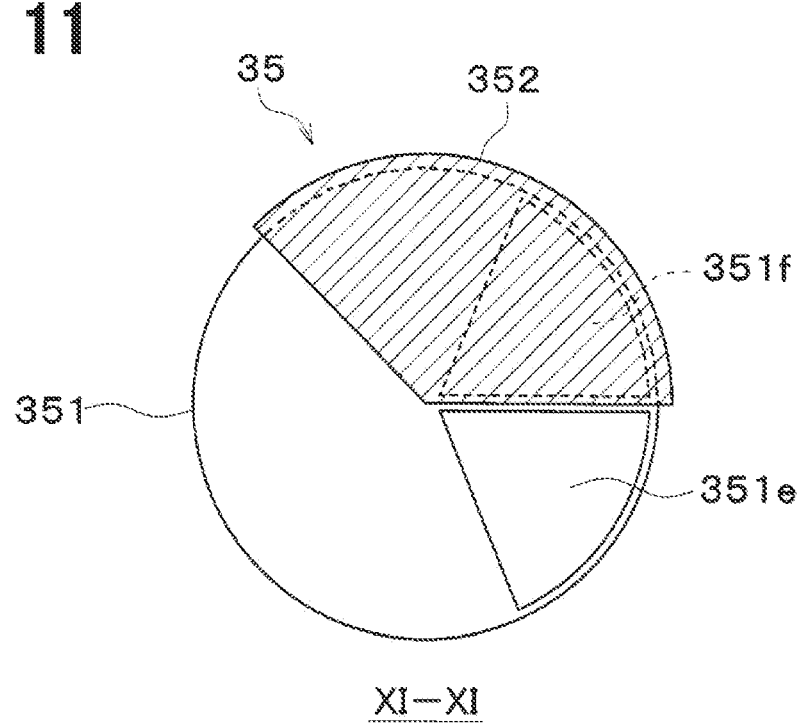
FIG. 11 is a schematic cross-sectional view taken along a line XI-XI of FIG. 10, illustrating an operating state of a three-way valve in the cooling/battery cooling mode of the first embodiment.

As shown in FIGS. 10 and 11, the three-way valve 35 has a housing 351, a valve body 352, and an actuator 353. The housing 351 has a cooling water inlet 351a, a battery passage side outlet 351b, and a battery radiator passage side outlet 351c.

The cooling water inlet 351a is an inlet for the heat medium. The cooling water inlet 351a and the battery passage side outlet 351b are connected to the battery passage 30c. The battery radiator passage side outlet 351c is connected to the battery radiator passage 30f.

A cooling water inlet space 351d, a battery passage side space 351e, and a battery radiator passage side space 351f are formed inside the housing 351. The cooling water inlet space 351d is an inlet space for the heat medium. The cooling water inlet space 351d communicates with the cooling water inlet 351a. The battery passage side space 351e communicates with the battery passage side outlet 351b. The battery radiator passage side space 351f communicates with the battery radiator passage side outlet 351c.

Each of the battery passage side space 351e and the battery radiator passage side space 351f communicates with the cooling water inlet space 351d. The battery passage side space 351e and the battery radiator passage side space 351f are adjacent to each other.

The valve body 352 opens and closes the battery passage side space 351e and the battery radiator passage side space 351f to change the communication state of the cooling water inlet space 351d relative to the battery passage side space 351e and the battery radiator passage side space 351f.

The valve body 352 is rotationally operated by the rotational driving force of the actuator 353. The operation of the actuator 353 is controlled by the controller 60.

FIG. 11 shows the operating state of the three-way valve 35 in the cooling/battery cooling mode. In the cooling/battery cooling mode, the valve body 352 opens the battery passage side space 351e and closes the battery radiator passage side space 351f.

Figure 12:
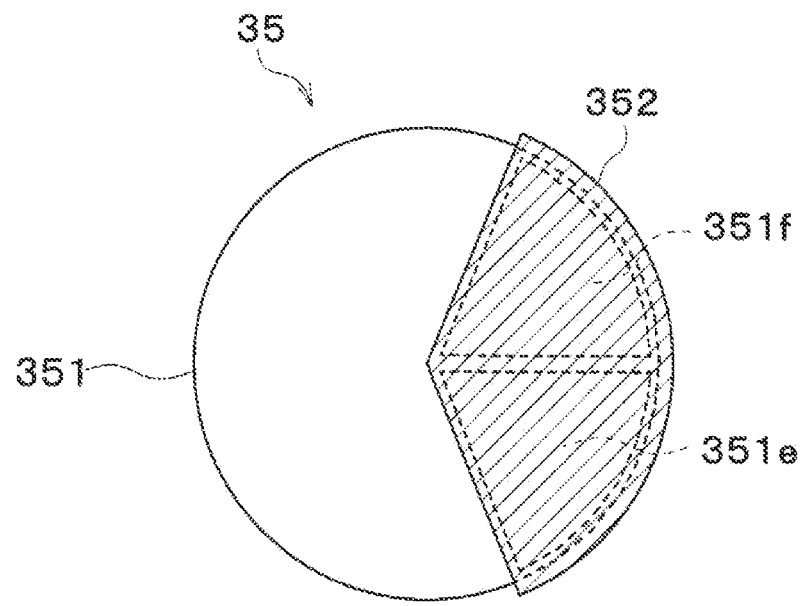
FIG. 12 is a schematic view illustrating an operating state of the three-way valve in the heating mode and the battery heating mode of the first embodiment.

FIG. 12 shows the operating state of the three-way valve 35 in the heating mode and the battery heating mode. In the heating mode and the battery heating mode, the valve body 352 closes the battery passage side space 351e and closes the battery radiator passage side space 351f.

Figure 13:
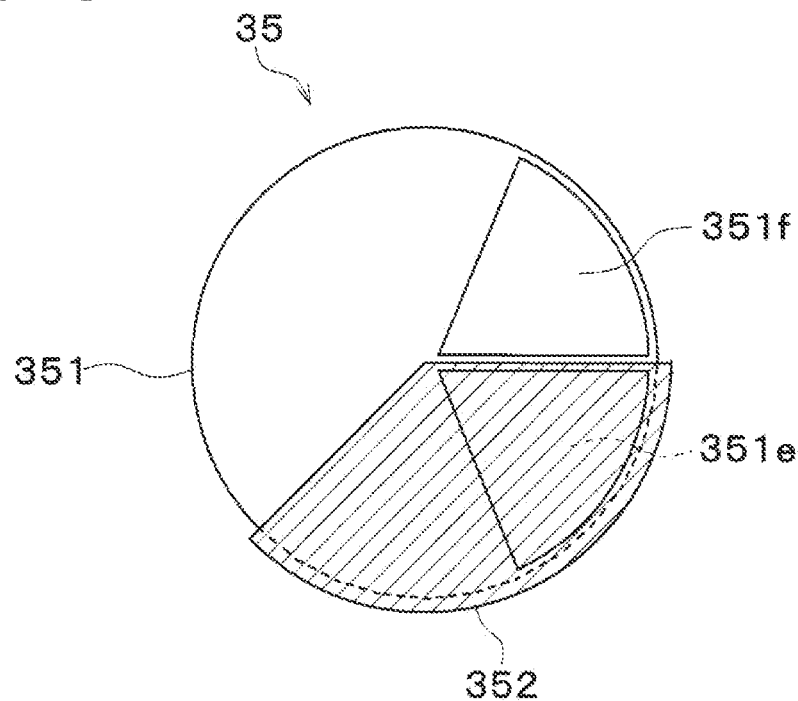
FIG. 13 is a schematic view illustrating an operating state of the three-way valve in a battery outside air cooling mode of the first embodiment.

FIG. 13 shows the operating state of the three-way valve 35 in the battery outside air cooling mode. In the battery outside air cooling mode, the valve body 352 closes the battery passage side space 351e and opens the battery radiator passage side space 351f.

Figure 14:
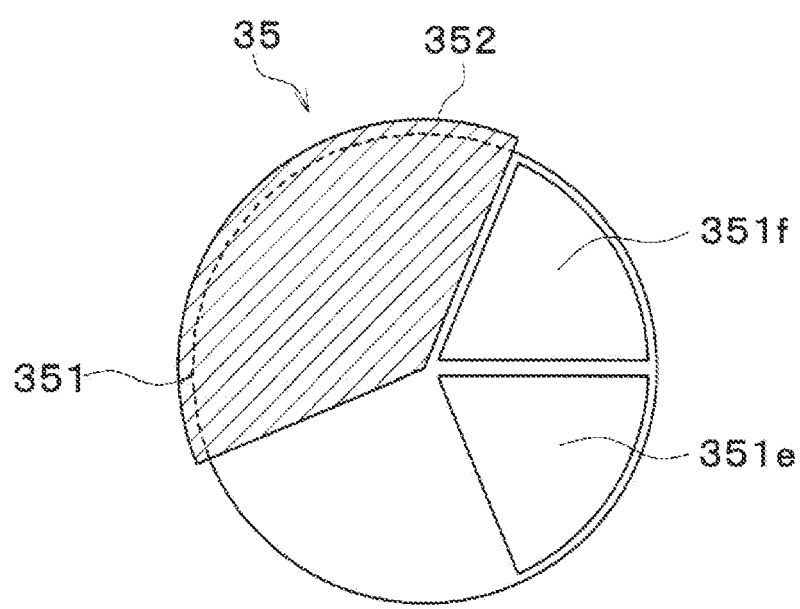
FIG. 14 is a schematic view illustrating an operating state of the three-way valve in the injection mode of the first embodiment.

FIG. 14 shows the operating state of the three-way valve 35 in the water injection mode. In the water injection mode, the valve body 352 opens the battery passage side space 351e and the battery radiator passage side space 351f.

As shown in FIG. 1, a flow rate adjusting valve 36 is arranged in the low-temperature-side radiator passage 30b upstream of the connection with the battery radiator passage 30f in the flow of the cooling water. The flow rate adjusting valve 36 opens and closes the low-temperature-side radiator passage 30b. The flow rate adjusting valve 36 adjusts the opening area of the low-temperature-side radiator passage 30b. The flow rate adjusting valve 36 is a low-temperature-side radiator flow rate reducing part that reduces the flow rate of the cooling water flowing through the low-temperature-side radiator 32.

The battery inlet side passage 20f is connected to the battery passage 30c at the low-temperature-side second confluence 30g. The battery inlet side passage 20f is connected to the high-temperature-side four-way valve 26.

The low-temperature-side second confluence 30g is arranged at the cooling water inlet side of the battery heat exchanger 33 in the battery passage 30c. At the low-temperature-side second confluence 30g, the cooling water from the condenser 12 merges toward the battery heat exchanger 33.

The battery outlet side passage 20g is connected to the battery passage 30c at the low-temperature-side second branch 30h. The battery outlet side passage 20g is connected to the condenser passage 20a at the cooling water inlet side of the high-temperature-side reserve tank 24.

The low-temperature-side second branch 30h is arranged at the cooling water outlet side of the battery heat exchanger 33 in the battery passage 30c. At the low-temperature-side second branch 30h, the cooling water flowing through the battery heat exchanger 33 branches to the condenser 12.

The air-side evaporator 14 and the heater core 22 are housed in an air conditioning casing 51 of the cabin air conditioner 50. The cabin air conditioner 50 is disposed inside an instrument panel (not illustrated) in the front part of the cabin. The air conditioning casing 51 is an air passage formation member for forming an air passage.

The heater core 22 is disposed in the air passage in the air conditioning casing 51 at the downstream side of the air-side evaporator 14 in the air flow. An inside/outside air switching box 52 and an indoor blower 53 are disposed in the air conditioning casing 51.

The inside/outside air switching box 52 is an inside/outside air switching unit for switching and introducing inside air and outside air into the air passage in the air conditioning casing 51. The indoor blower 53 sucks and blows the inside air and outside air introduced into the air passage in the air conditioning casing 51 through the inside/outside air switching box 52. The operation of the indoor blower 53 is controlled by the controller 60.

An air mix door 54 is disposed between the air-side evaporator 14 and the heater core 22 in the air passage in the air conditioning casing 51. The air mix door 54 regulates the ratio of the amount of cold air flowing into the heater core 22 and the amount of cold air flowing into the bypass passage 55, of cold air having passed through the air-side evaporator 14.

The bypass passage 55 is an air passage in which the cold air having passed through the air-side evaporator 14 bypasses the heater core 22.

The air mix door 54 is a rotary door having a rotary shaft rotatably supported to the air conditioning casing 51 and a door substrate part coupled to the rotary shaft. By regulating the opening position of the air mix door 54, the temperature of the air blown into the cabin from the air conditioning casing 51 can be regulated to a desired temperature.

The rotary shaft of the air mix door 54 is driven by a servomotor 56. The operation of the servomotor is controlled by the controller 60.

The air mix door 54 may be a sliding door that slides in a direction substantially orthogonal to the air flow. The sliding door may be a plate-shaped door formed of a rigid body, or may be a film door formed of a flexible film material.

The air regulated in temperature by the air mix door 54 is blown out into the cabin from a blowout port 57 formed in the air conditioning casing 51.

The cabin air conditioner 50 and the first expansion valve 13 are arranged in the cabin 4. The cabin 4 is separated from the drive unit room 6 by a partition wall 5. The partition wall 5 is a so-called firewall arranged for soundproofing and fireproofing the cabin 4.

The drive unit room 6 is a space in which the electric motor is arranged. The drive unit room 6 is arranged on the front side of the cabin 4. A grill for introducing outside air into the drive unit room 6 is formed at the most front part of the drive unit room 6. Therefore, the space inside the drive unit room 6 becomes a space outside the cabin where the outside air is introduced.

The controller 60 shown in FIG. 2 is composed of a well-known microcomputer including a CPU, ROM, RAM, and the like, and peripheral circuits thereof. The controller 60 performs various calculations and processes based on a control program stored in the ROM. Various control target devices are connected to an output side of the controller 60. The controller 60 is a control unit that controls the control target devices.

The controller 60 controls the radiator shutter 3, the compressor 11, the second expansion valve 16, the high-temperature-side four-way valve 26, the three-way valve 35, the flow rate adjusting valve 36, the outdoor blower 40, the indoor blower 53, and the servomotor 56 for the air mix door 54.

Software and hardware for controlling the electric motor of the compressor 11 in the controller 60 are a refrigerant discharge capacity control part. Software and hardware for controlling the second expansion valve 16 in the controller 60 are a throttle control part.

The software and hardware that control the high-temperature-side four-way valve 26 in the controller 60 is a high-temperature heat medium flow control part.

The software and hardware that control the three-way valve 35 and the flow rate adjusting valve 36 in the controller 60 are a low-temperature heat medium flow control part.

The software and hardware that control the outdoor blower 40 in the controller 60 are an outside air blowing capacity control part.

The software and hardware that control the indoor blower 53 in the controller 60 are an air blowing capacity control part.

The software and hardware that control the servomotor 56 for the air mix door 54 in the controller 60 are an air volume ratio control part.

The input side of the controller 60 is connected with a various control sensor group such as an inside air temperature sensor 61, an outside air temperature sensor 62, a solar radiation sensor 63, an evaporator suction air temperature sensor 64, an evaporator temperature sensor 65, a heater core inlet cooling water temperature sensor 66, a battery inlet cooling water temperature sensor 67, and a battery temperature sensor 68.

The inside air temperature sensor 61 detects a cabin temperature Tr. The outside air temperature sensor 62 detects an outside air temperature Tam. The solar radiation sensor 63 detects a solar irradiance Ts into the cabin.

The evaporator suction air temperature sensor 64 is an air temperature detection unit that detects the temperature TEin of the air sucked into the air-side evaporator 14.

The evaporator temperature sensor 65 is a temperature detection unit that detects the temperature TE of the air-side evaporator 14. The evaporator temperature sensor 65 is, for example, a fin thermistor for detecting the temperature of a heat exchange fin of the air-side evaporator 14, or a refrigerant temperature sensor for detecting the temperature of a refrigerant flowing in the air-side evaporator 14.

The heater core inlet cooling water temperature sensor 66 is a heat medium temperature detection part for detecting a temperature THin of cooling water flowing into the heater core 22.

The battery inlet cooling water temperature sensor 67 is a heat medium temperature detection part for detecting the temperature of cooling water flowing into the battery 2.

The battery temperature sensor 68 is a battery temperature detection part for detecting the temperature of the battery 2. For example, the battery temperature sensor 68 detects the temperature of each cell of the battery 2.

Various operation switches (not illustrated) are connected to the input side of the controller 60. The various operation switches are provided on an operation panel 70 and operated by an occupant. The operation panel 70 is disposed near the instrument panel in the front part of the cabin. The controller 60 receives inputs of operation signals from the various operation switches.

The various operation switches are an air conditioner switch, a temperature setting switch, and the like. The air conditioner switch sets whether or not air is cooled by the cabin air conditioner 50. The temperature setting switch sets a set temperature in the cabin.

Next, the operation in the above configuration will be described. The controller 60 switches the operation mode based on the detection results of the sensors 61 to 68 described above, the operation state of various operation switches on the operation panel 70, and the like. The operation mode includes at least a cooling/battery cooling mode, a heating mode, a dehumidifying heating mode, a battery outside air cooling mode, and a battery heating mode.

In the cooling/battery cooling mode, the cabin is cooled by cooling the air blown into the cabin by the air-side evaporator 14, and the battery 2 is cooled by the cooling water cooled by the cooling water-side evaporator 17.

In the heating mode, the cabin is heated by heating the air blown into the cabin with the heater core 22.

In the dehumidifying heating mode, the air blown into the cabin is cooled and dehumidified by the air-side evaporator 14, and the air cooled and dehumidified by the air-side evaporator 14 is heated by the heater core 22 to dehumidify and heat the cabin.

In the dehumidifying heating mode, when the amount of heat of the cooling water of the high-temperature cooling water circuit 20 is surplus with respect to the amount of heat required for the heater core 22, the excess heat of the cooling water of the high-temperature cooling water circuit 20 is emitted by the high-temperature-side radiator 23 to the outside air.

In the battery outside air cooling mode, the battery 2 is cooled by the cooling water cooled by the low-temperature-side radiator 32. In the battery heating mode, the battery 2 is heated by the cooling water heated by the condenser 12.

Next, specific operations in the cooling/battery cooling mode, the heating mode, the dehumidifying heating mode, the battery outside air cooling mode, and the battery heating mode will be described.

(1) Cooling/Battery Cooling Mode

In the cooling/battery cooling mode, the controller 60 operates the compressor 11, the high-temperature-side pump 21, and the low-temperature-side pump 31.

In the cooling/battery cooling mode, the controller 60 opens the first expansion valve 13 and the second expansion valve 16 at the throttle opening degree.

In the cooling/battery cooling mode, the controller 60 controls the high-temperature-side four-way valve 26 as shown in FIG. 5. As a result, the heater core passage 20b is closed, the high-temperature-side radiator passage 20c is opened, and the battery inlet side passage 20f is closed.

In the cooling/battery cooling mode, the controller 60 controls the three-way valve 35 as shown in FIG. 11. As a result, the battery passage 30c is opened and the battery radiator passage 30f is closed.

In the cooling/battery cooling mode, the controller 60 controls the flow rate adjusting valve 36 so that the low-temperature-side radiator passage 30b is closed.

As a result, in the refrigeration cycle device 10 at the cooling/battery cooling mode, the refrigerant flows as shown by the thick solid line in FIG. 15, and the state of the refrigerant circulating in the cycle changes as follows.

That is, a high-pressure refrigerant discharged from the compressor 11 flows into the condenser 12. The refrigerant flowing into the condenser 12 radiates heat to the cooling water of the high-temperature cooling water circuit 20. Thus, the refrigerant is cooled and condensed by the condenser 12.

The refrigerant flowing out of the condenser 12 flows into the first expansion valve 13 and is decompressed and expanded by the first expansion valve 13 until becoming a low-pressure refrigerant. The low-pressure refrigerant decompressed by the first expansion valve 13 flows into the air-side evaporator 14 and absorbs the heat from the air blown into the cabin to evaporate. Thus, the air blown into the cabin is cooled.

The refrigerant flowing out of the air-side evaporator 14 flows to the suction side of the compressor 11 and is again compressed by the compressor 11.

In this way, in the cooling/battery cooling mode, the air-side evaporator 14 allows the low-pressure refrigerant to absorb heat from the air, and the cooled air can be blown out into the cabin. Thus, the cabin can be cooled.

Figure 15:
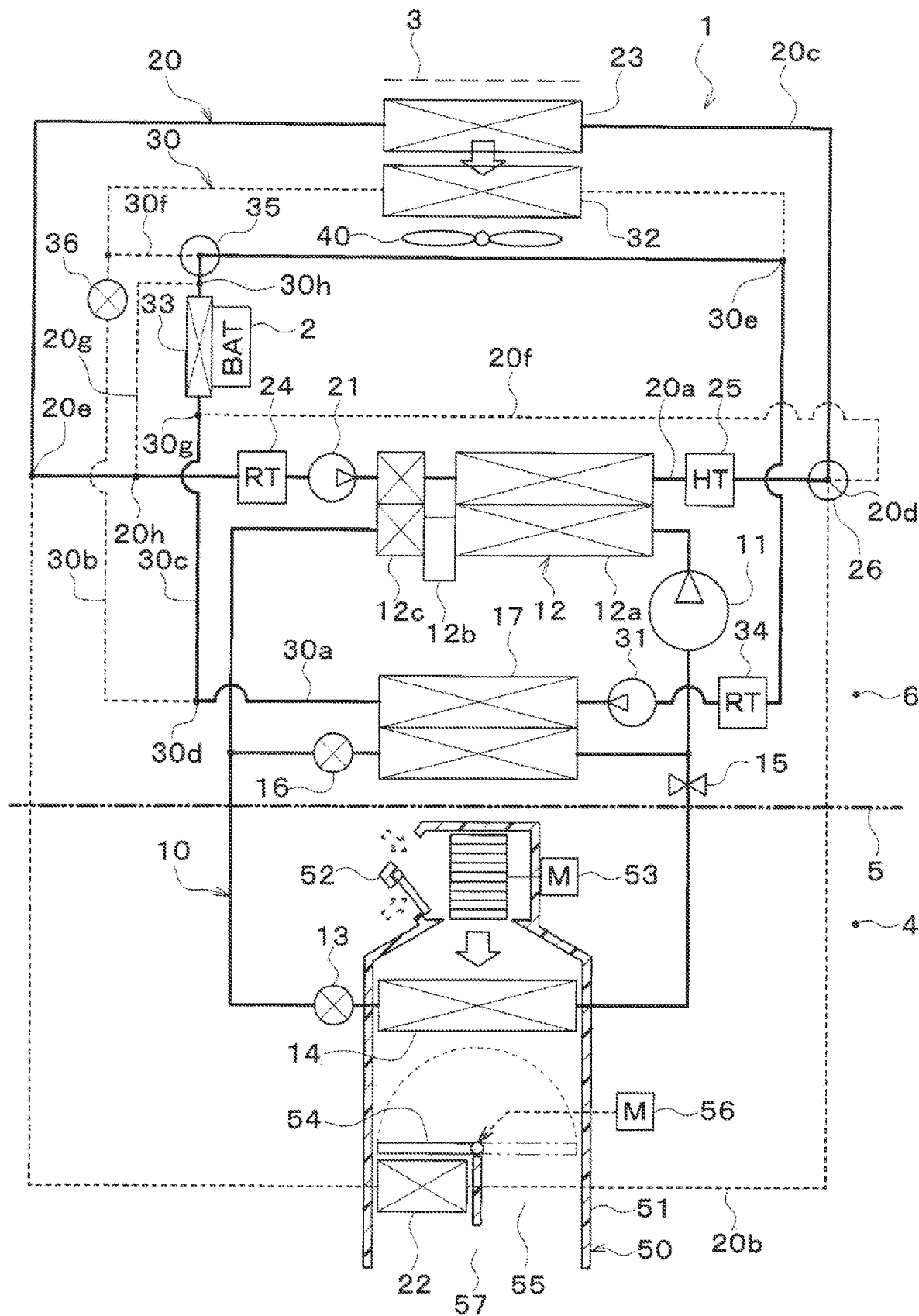
FIG. 15 is an overall configuration diagram illustrating an operating state of the vehicle temperature control device according to the first embodiment in the cooling/battery cooling mode.

At the same time, in the refrigeration cycle device 10 in the cooling/battery cooling mode, as shown by the thick solid line in FIG. 15, the refrigerant flowing out of the condenser 12 flows into the second expansion valve 16. At the second expansion valve 16, the refrigerant is decompressed and expanded until becoming a low-pressure refrigerant. The low-pressure refrigerant decompressed by the second expansion valve 16 flows into the cooling-water-side evaporator 17 and absorbs heat from the cooling water of the low-temperature cooling water circuit 30 to evaporate. Thus, the cooling water of the low-temperature cooling water circuit 30 is cooled. Then, in the low-temperature cooling water circuit 30, as shown by the thick solid line in FIG. 15, the cooling water circulates in the battery heat exchanger 33 to cool the battery 2.

In the high-temperature cooling water circuit 20 in the cooling/battery cooling mode, as shown by the thick solid line in FIG. 15, the cooling water of the high-temperature cooling water circuit 20 circulates in the high-temperature-side radiator 23, and the heat of the cooling water is emitted to the outside air at the high-temperature-side radiator 23.

(2) Heating Mode

In the heating mode, the controller 60 operates the compressor 11, the high-temperature-side pump 21, and the low-temperature-side pump 31.

In the heating mode, the controller 60 opens the first expansion valve 13 at the throttle opening degree and closes the second expansion valve 16.

In the heating mode, the controller 60 controls the high-temperature-side four-way valve 26 as shown in FIG. 6. As a result, the heater core passage 20b is opened, the high-temperature-side radiator passage 20c is closed, and the battery inlet side passage 20f is closed.

In the heating mode, the controller 60 controls the three-way valve 35 as shown in FIG. 12. As a result, the battery passage 30c is closed, and the battery radiator passage 30f is closed.

In the heating mode, the controller 60 controls the flow rate adjusting valve 36 so that the low-temperature-side radiator passage 30b is opened.

As a result, in the refrigeration cycle device 10 in the heating mode, the refrigerant flows as shown by the thick solid line in FIG. 16, and the state of the refrigerant circulating in the cycle changes as follows.

That is, a high-pressure refrigerant discharged from the compressor 11 flows into the condenser 12. The refrigerant flowing into the condenser 12 radiates heat to the cooling water of the high-temperature cooling water circuit 20. Thus, the refrigerant is cooled and condensed by the condenser 12.

The refrigerant flowing out of the condenser 12 flows into the second expansion valve 16 and is decompressed and expanded by the second expansion valve 16 until becoming a low-pressure refrigerant. The low-pressure refrigerant decompressed by the second expansion valve 16 flows into the cooling-water-side evaporator 17 and absorbs heat from the cooling water of the low-temperature cooling water circuit 30 to evaporate. Thus, the cooling water of the low-temperature cooling water circuit 30 is cooled. Then, in the low-temperature cooling water circuit 30, as shown by the thick solid line in FIG. 16, the cooling water circulates in the low-temperature-side radiator 32, and the cooling water absorbs heat from the outside air.

Figure 16:
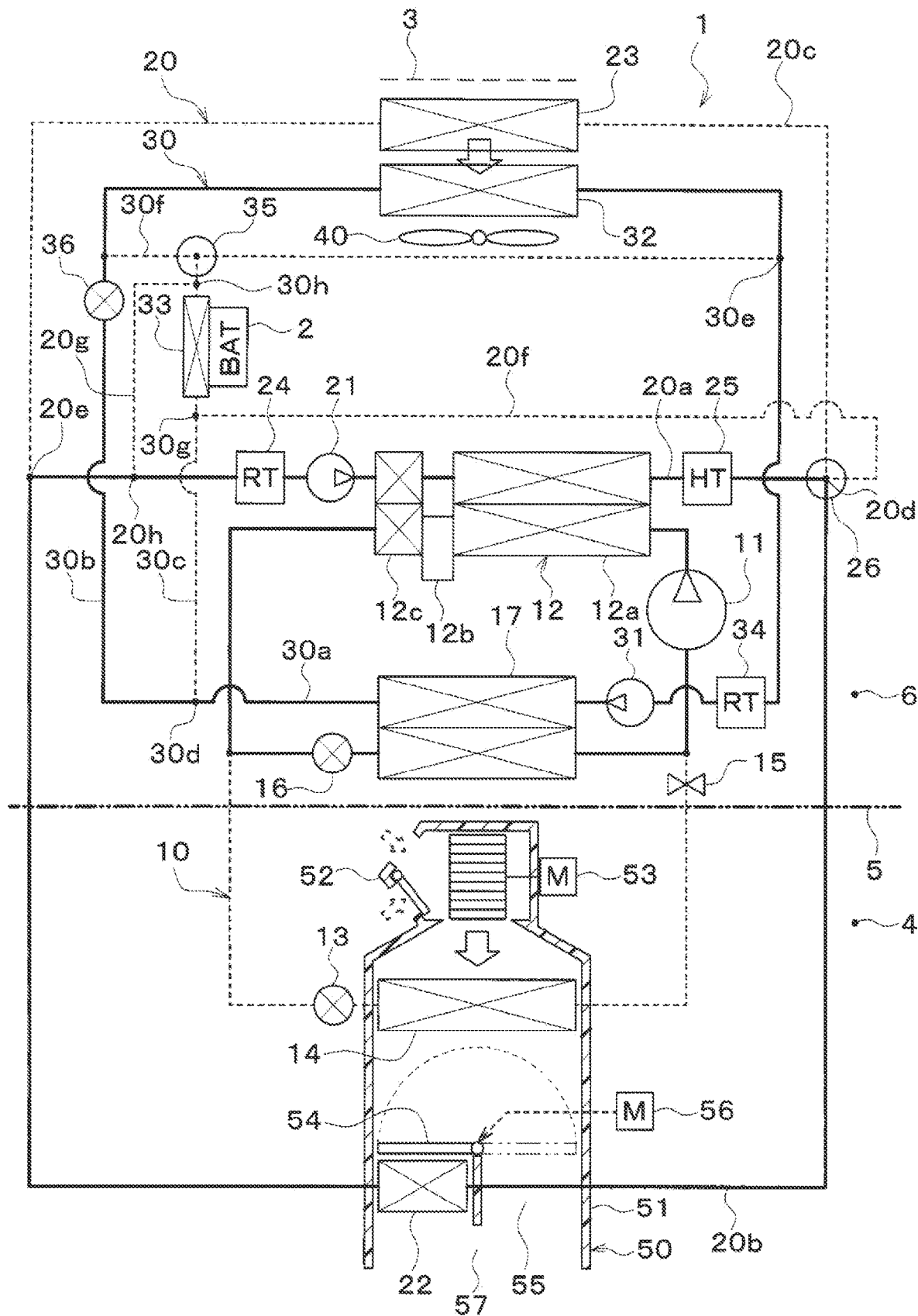
FIG. 16 is an overall configuration diagram illustrating an operating state of the vehicle temperature control device according to the first embodiment in the heating mode.

In the high-temperature cooling water circuit 20 in the heating mode, as shown by the thick solid line in FIG. 16, the cooling water of the high-temperature cooling water circuit 20 circulates in the heater core 22, and the cooling water emits heat to the air blown into the cabin at the heater core 22. In this manner, the cabin is heated.

When the amount of heat absorbed by the cooling water from the outside air is insufficient with respect to the amount of heat required for heating the cabin, the amount of heat can be supplemented by operating the electric heater 25.

(3) Dehumidifying Heating Mode

In the dehumidifying heating mode, the controller 60 operates the compressor 11 and the high-temperature-side pump 21 and stops the low-temperature-side pump 31.

In the dehumidifying heating mode, the controller 60 opens the first expansion valve 13 at the throttle opening degree and closes the second expansion valve 16.

In the dehumidifying heating mode, the controller 60 controls the high-temperature-side four-way valve 26 as shown in FIG. 7. As a result, the heater core passage 20b is opened, the high-temperature-side radiator passage 20c is opened, and the battery inlet side passage 20f is closed.

In the refrigeration cycle device 10 in the dehumidifying heating mode, the refrigerant flows as shown by the thick solid line in FIG. 17, and the state of the refrigerant circulating in the cycle changes as follows.

That is, the high-pressure refrigerant discharged from the compressor 11 flows into the condenser 12 and exchanges heat with the cooling water of the high-temperature cooling water circuit 20 to dissipate heat. Thus, the cooling water of the high-temperature cooling water circuit 20 is heated.

The refrigerant flowing out of the condenser 12 flows into the first expansion valve 13 and is decompressed and expanded by the first expansion valve 13 until becoming a low-pressure refrigerant. The low-pressure refrigerant decompressed by the first expansion valve 13 flows into the air-side evaporator 14 and absorbs the heat from the air blown into the cabin to evaporate. Thus, the air blown into the cabin is cooled and dehumidified.

Then, the refrigerant flowing out of the cooling-water-side evaporator 17 flows to the suction side of the compressor 11 and is compressed again by the compressor 11.

Figure 17:
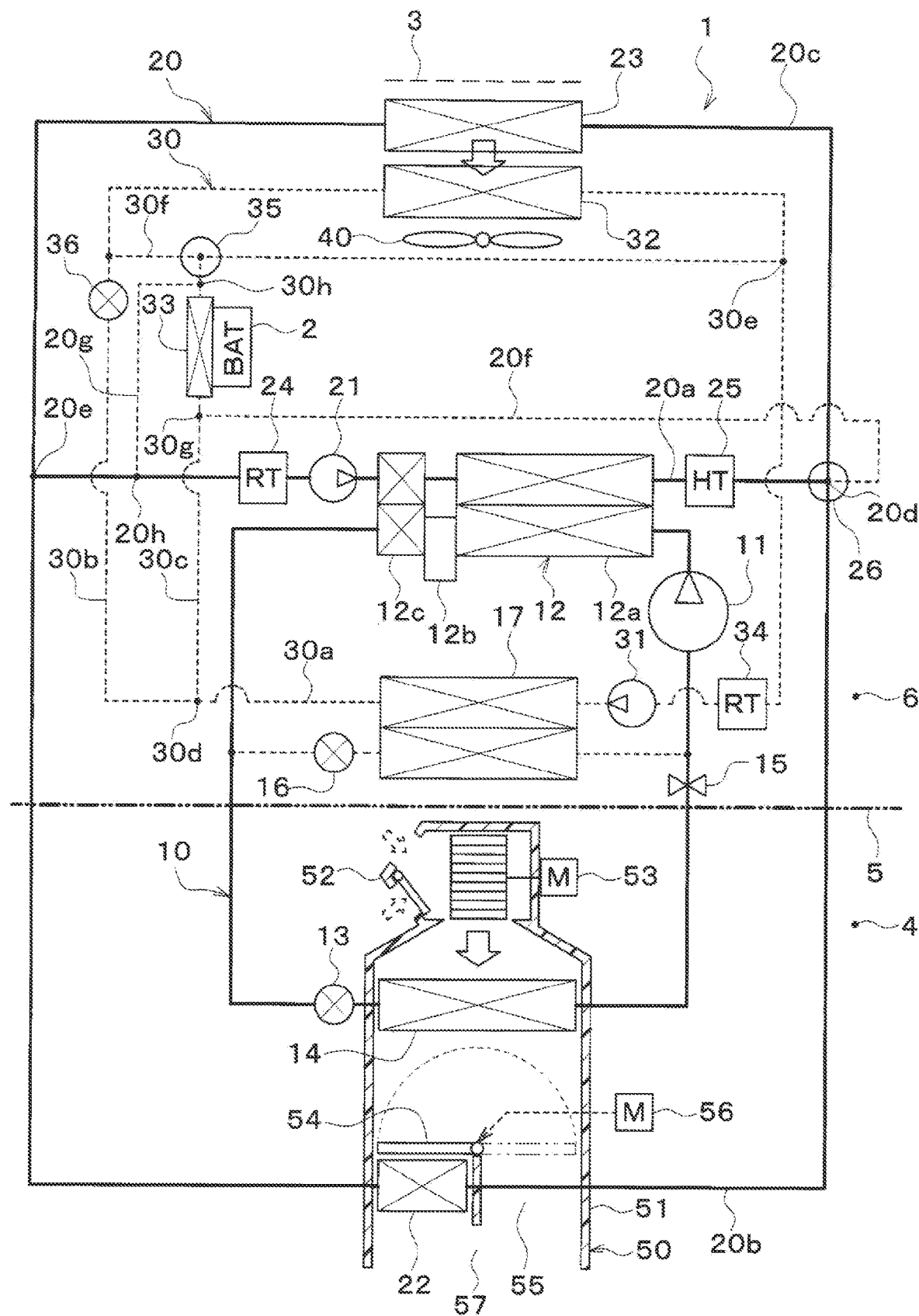
FIG. 17 is an overall configuration diagram illustrating an operating state of the vehicle temperature control device according to the first embodiment in the dehumidifying heating mode.

In the high-temperature cooling water circuit 20 in the dehumidifying heating mode, as shown by the thick solid line in FIG. 17, the cooling water of the high-temperature cooling water circuit 20 circulates in the heater core 22.

The control signal to be output to the servomotor of the air mix door 54 is determined so that the air mix door 54 is located at the double chain position in FIG. 1 to fully open the air passage of the heater core 22. Thus, the total flow of the air having passed through the air-side evaporator 14 passes through the heater core 22.

Thereby, at the heater core 22, heat is radiated from the cooling water of the high-temperature cooling water circuit 20 to the air blown into the cabin. Therefore, the air cooled and dehumidified by the air-side evaporator 14 is heated by the heater core 22 and blown out into the cabin.

At the same time, in the high-temperature cooling water circuit 20, as shown by the thick solid line in FIG. 17, the cooling water circulates in the high-temperature-side radiator 23, and the high-temperature-side radiator 23 dissipates heat from the cooling water to the outside air.

Thus, in the dehumidifying heating mode, the heat of the high-pressure refrigerant discharged from the compressor 11 is radiated to the cooling water of the high-temperature cooling water circuit 20 by the condenser 12. The heat of the cooling water of the high-temperature cooling water circuit 20 is radiated to the air in the heater core 22, and the air heated by the heater core 22 can be blown out into the cabin.

In the heater core 22, air cooled and dehumidified by an air-side evaporator 14 is heated. As a result, the cabin can be dehumidified and heated.

In the dehumidifying heating mode, the excess heat of the cooling water of the high-temperature cooling water circuit 20 is dissipated to the outside air by the high-temperature-side radiator 23. That is, when the amount of heat of the cooling water of the high-temperature cooling water circuit 20 is surplus with respect to the amount of heat required by the heater core 22, the surplus heat is dissipated to the outside air by the high-temperature-side radiator 23.

In the dehumidifying heating mode, the flow rate of the cooling water of the high-temperature cooling water circuit 20 flowing in the high-temperature-side radiator 23 is set such that the excess heat of the cooling water of the high-temperature cooling water circuit 20 is radiated to the outside air.

Therefore, in the dehumidifying heating mode, the opening degree of the high-temperature-side radiator passage 20c in the high-temperature-side four-way valve 26 is set such that the excess heat of the cooling water of the high-temperature cooling water circuit 20 can be dissipated to the outside air by the high-temperature-side radiator 23.

When it is necessary to cool the battery 2 in the dehumidifying heating mode, the controller 60 opens the second expansion valve 16 at the throttle opening, and controls the low-temperature-side pump 31 and the three-way valve 35 such that the cooling water of the low-temperature cooling water circuit 30 circulates between the cooling-water-side evaporator 17 and the battery heat exchanger 33.

As a result, in the refrigeration cycle device 10, the refrigerant flowing out of the condenser 12 flows into the second expansion valve 16 and is decompressed and expanded by the second expansion valve 16 until becoming a low-pressure refrigerant. The low-pressure refrigerant decompressed by the second expansion valve 16 flows into the cooling-water-side evaporator 17 and absorbs heat from the cooling water of the low-temperature cooling water circuit 30 to evaporate. Thus, the cooling water of the low-temperature cooling water circuit 30 is cooled. Then, in the low-temperature cooling water circuit 30, the cooling water circulates in the battery heat exchanger 33 to cool the battery 2.

(4) Battery Outside Air Cooling Mode

In the battery outside air cooling mode, the controller 60 stops the compressor 11 and the high-temperature-side pump 21 and operates the low-temperature-side pump 31.

In the battery outside air cooling mode, the controller 60 controls the three-way valve 35 as shown in FIG. 13. As a result, the battery passage 30c is closed and the battery radiator passage 30f is opened.

In the battery outside air cooling mode, the controller 60 controls the flow rate adjusting valve 36 so that the low-temperature-side radiator passage 30b is closed.

Figure 18:
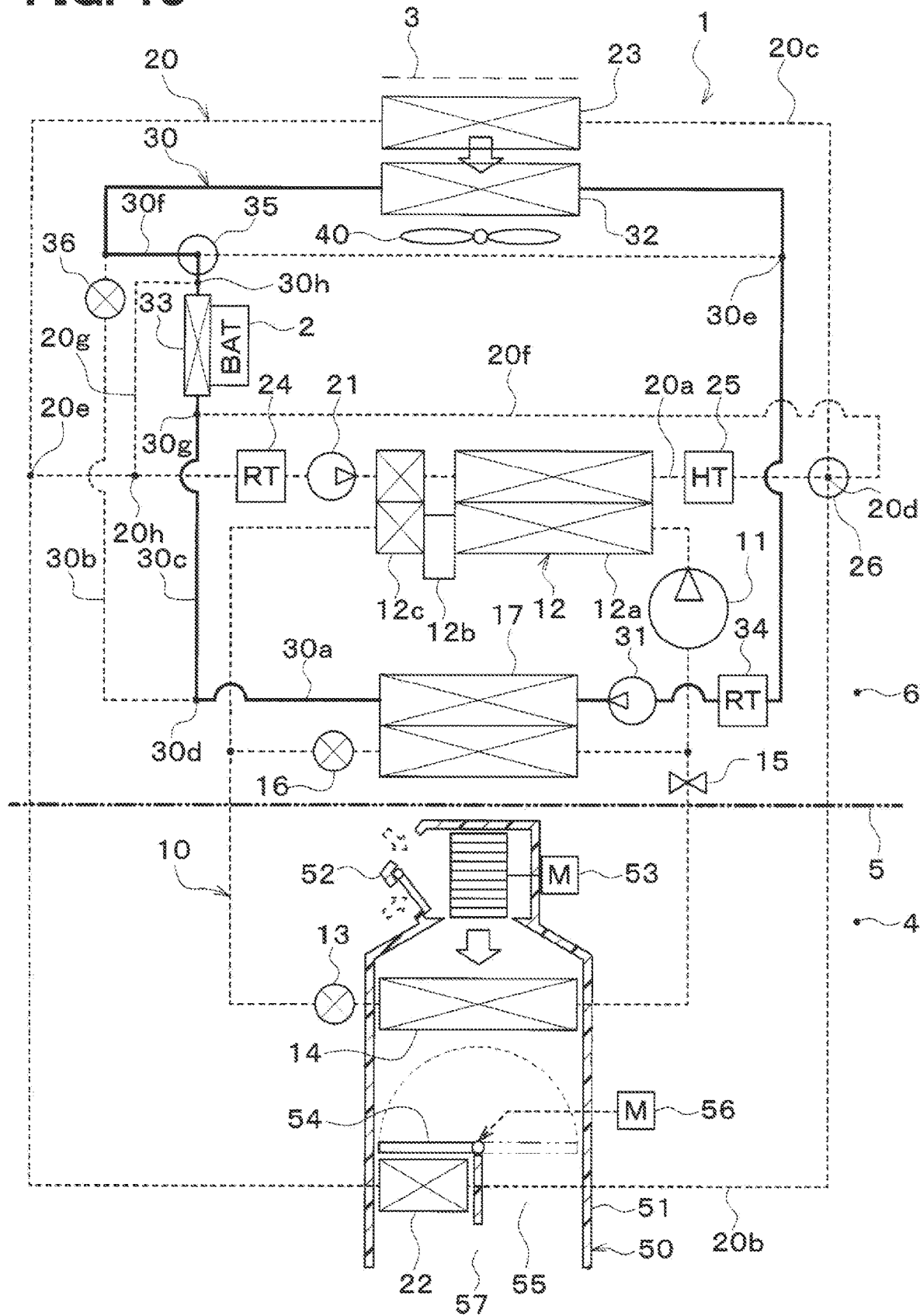
FIG. 18 is an overall configuration diagram illustrating an operating state of the vehicle temperature control device according to the first embodiment in the battery outside air cooling mode.

As a result, in the low-temperature cooling water circuit 30 in the battery outside air cooling mode, the cooling water circulates in the low-temperature-side radiator 32 and the battery heat exchanger 33 as shown by the thick solid line in FIG. 18. The cooling water is cooled by the outside air in the low-temperature-side radiator 32, and the battery 2 is cooled by the cooling water cooled by the low-temperature-side radiator 32.

(4) Battery Heating Mode

In the battery heating mode, the controller 60 operates the high-temperature-side pump 21 and the electric heater 25, and stops the compressor 11 and the low-temperature-side pump 31.

In the battery heating mode, the controller 60 controls the high-temperature-side four-way valve 26 as shown in FIG. 8. As a result, the heater core passage 20b is closed, the high-temperature-side radiator passage 20c is closed, and the battery inlet side passage 20f is opened.

In the battery heating mode, the controller 60 controls the three-way valve 35 as shown in FIG. 12. As a result, the battery passage 30c is closed, and the battery radiator passage 30f is closed.

In the battery heating mode, the controller 60 controls the flow rate adjusting valve 36 so that the low-temperature-side radiator passage 30b is closed.

Figure 19:
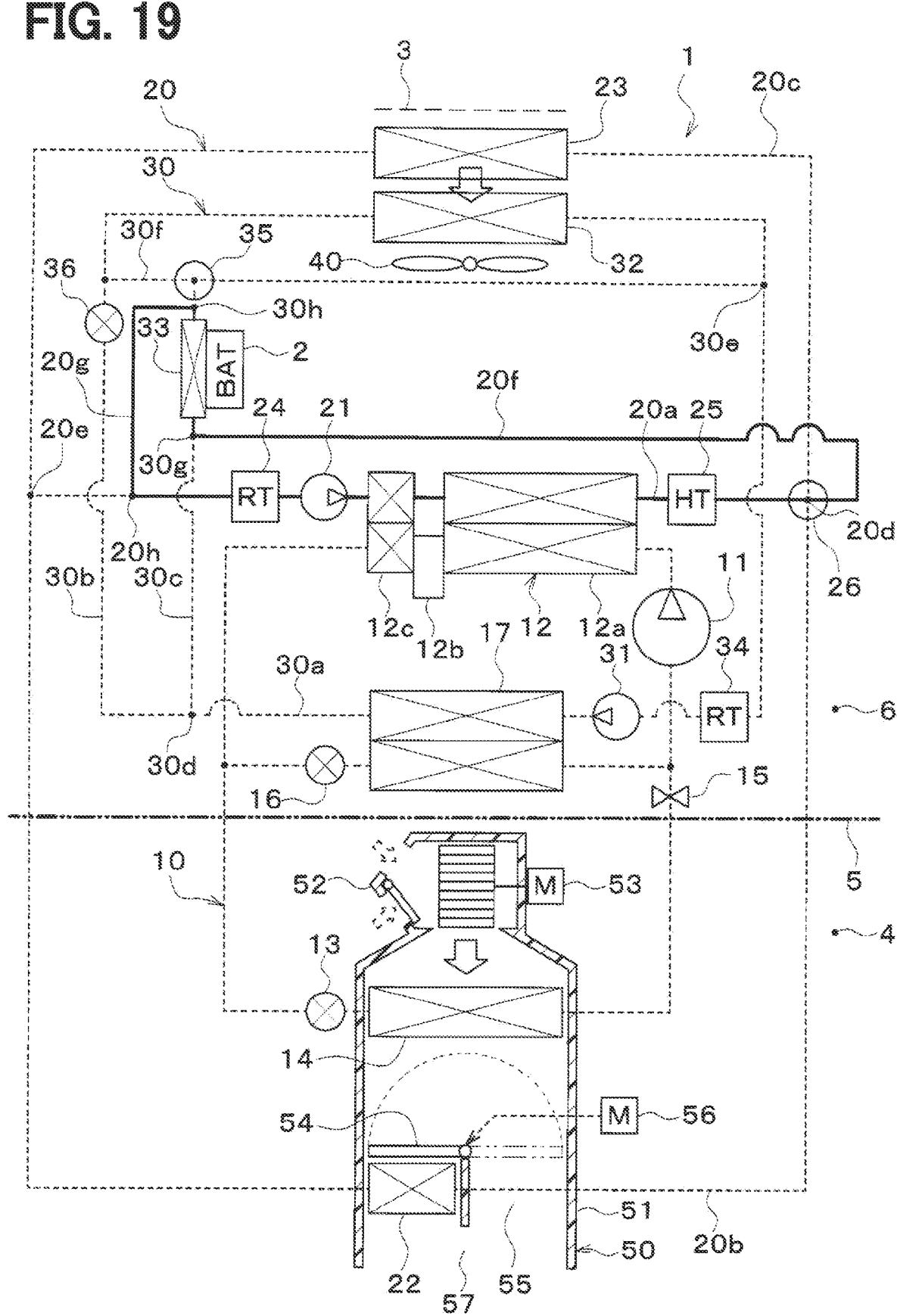
FIG. 19 is an overall configuration diagram illustrating an operating state of the vehicle temperature control device according to the first embodiment in the battery heating mode.

As a result, in the high-temperature cooling water circuit 20 and the low-temperature cooling water circuit 30 in the battery outside air cooling mode, the cooling water circulates in the electric heater 25 and the battery heat exchanger 33 as shown by the thick solid line in FIG. 19. The cooling water is heated by the electric heater 25, and the battery 2 is heated by the cooling water heated by the electric heater 25.

Further, the controller 60 can set the water injection mode and the air bleeding mode during maintenance of the vehicle temperature control device 1.

The water injection mode is an operation mode executed when cooling water is injected into the high-temperature cooling water circuit 20 and the low-temperature cooling water circuit 30.

The air bleeding mode is an operation mode executed when air is separated from the cooling water of the high-temperature cooling water circuit 20 and the low-temperature cooling water circuit 30.

(6) Water Injection Mode

In the water injection mode, the controller 60 controls the high-temperature-side four-way valve 26 as shown in FIG. 9. As a result, the heater core passage 20b is opened, the high-temperature-side radiator passage 20c is opened, and the battery inlet side passage 20f is opened.

In the water injection mode, the controller 60 controls the three-way valve 35 as shown in FIG. 14. As a result, the battery passage 30c is opened, and the battery radiator passage 30f is opened.

In the water injection mode, the controller 60 controls the flow rate adjusting valve 36 so that the low-temperature-side radiator passage 30b is opened.

As a result, the cooling water injected into the high-temperature cooling water circuit 20 and the low-temperature cooling water circuit 30 can be distributed entirely to the high-temperature cooling water circuit 20 and the low-temperature cooling water circuit 30 as quickly as possible.

(7) Air Bleeding Mode

In the air bleeding mode, the controller 60 controls the high-temperature-side four-way valve 26 so that the high-temperature cooling water circuit 20 switches in order of the battery outside air cooling mode, the heating mode, and the battery heating mode at a predetermined time interval.

In the air bleeding mode, the controller 60 controls the three-way valve 35 and the flow rate adjusting valve 36 so that the low-temperature cooling water circuit 30 switches in order of the heating mode, the battery outside air cooling mode, and the cooling/battery cooling mode at a predetermined time interval. As a result, air can be reliably evacuated.

In the present embodiment, the high-temperature-side radiator 23 and the heater core 22 are arranged in parallel with each other in the flow of the cooling water whose heat is radiated by the condenser 12. The high-temperature-side four-way valve 26 is arranged at the high-temperature-side first branch 20d to reduce the flow rate of the cooling water flowing through the high-temperature-side radiator 23.

Accordingly, the flexibility in how to flow the cooling water to the high-temperature-side radiator 23, the heater core 22, and the battery heat exchanger 33 can be increased. When the battery 2 is heated by the cooling water flowing through the battery heat exchanger 33, the heat loss in the high-temperature-side radiator 23 can be reduced, so that the battery 2 can be heated efficiently.

In the present embodiment, the high-temperature-side four-way valve 26 is arranged at the high-temperature-side first branch 20d to reduce the flow rate of the cooling water flowing through the heater core 22. Accordingly, when the battery 2 is heated by the cooling water flowing through the battery heat exchanger 33, the heat loss in the heater core 22 can be reduced, so that the battery 2 can be heated efficiently.

In the present embodiment, the high-temperature-side four-way valve 26 is one valve device that opens and closes the cooling water passage on the battery heat exchanger 33 side and adjusts the opening degree of the cooling water passage on the high-temperature-side radiator 23 side. This makes it possible to simplify the configuration of the high-temperature cooling water circuit 20.

In the present embodiment, the high-temperature-side four-way valve 26 is one valve device that opens and closes the cooling water passage on the battery heat exchanger 33 side and adjusts the opening degree of the cooling water passage on the heater core 22 side. This makes it possible to simplify the configuration of the high-temperature cooling water circuit 20.

In the present embodiment, the high-temperature-side four-way valve 26 is connected to the condenser passage 20a, the heater core passage 20b, the high-temperature-side radiator passage 20c, and the battery inlet side passage 20f. The high-temperature-side four-way valve 26 controls the flow rate of the cooling water flowing from the condenser passage 20a to the heater core passage 20b, the flow rate of the cooling water flowing from the condenser passage 20a to the high-temperature-side radiator passage 20c, and the flow rate of the cooling water flowing from the condenser passage 20a to the battery inlet side passage 20f.

Accordingly, the flexibility in how to flow the cooling water to the high-temperature-side radiator 23, the heater core 22, and the battery heat exchanger 33 can be increased. Then, when the battery 2 is heated by the cooling water flowing through the battery heat exchanger 33, the heat loss in the high-temperature-side radiator 23 can be reduced, so that the battery 2 can be heated efficiently. Further, the configuration of the high-temperature cooling water circuit 20 can be simplified.

In the present embodiment, the electric heater 25 is arranged in the cooling water passage from the high-temperature-side second confluence 20h via the condenser 12 to the high-temperature-side first branch 20d. As a result, the heat generated by the electric heater 25 can be effectively used in both the heater core 22 and the battery heat exchanger 33.

In the present embodiment, the high-temperature-side reserve tank 24 is arranged in the cooling water passage from the high-temperature-side second confluence 20h to the high-temperature-side first branch 20d via the condenser 12. As a result, the high-temperature-side reserve tank 24 can separate the cooling water between gas and liquid after flowing through each of the high-temperature-side radiator 23, the heater core 22, and the battery heat exchanger 33.

In the present embodiment, the battery heat exchanger 33 and the low-temperature-side radiator 32 are arranged in parallel with each other in the flow of the cooling water whose heat is absorbed by the cooling-water-side evaporator 17. The flow rate adjusting valve 36 is arranged in the cooling water passage from the low-temperature-side first branch 30d to the low-temperature-side first confluence 30e via the low-temperature-side radiator 32, to reduce the flow rate of the cooling water flowing through the low-temperature-side radiator 32.

Accordingly, the degree of freedom of how to flow the cooling water to the battery heat exchanger 33 and the low-temperature-side radiator 32 can be increased. Then, when the cooling water whose heat is radiated by the condenser 12 is made to pass through the battery heat exchanger 33 to heat the battery 2, the heat loss in the low-temperature-side radiator 32 can be reduced, so that the battery 2 can be heated efficiently.

In the present embodiment, the flow rate adjusting valve 36 adjusts the flow rate of the cooling water flowing from the evaporator passage 30a to the low-temperature-side radiator passage 30b. Accordingly, the configuration of the low-temperature cooling water circuit 30 can be simplified.

In the present embodiment, the low-temperature-side pump 31 is arranged in the cooling water passage from the low-temperature-side first confluence 30e to the low-temperature-side first branch 30d via the cooling-water-side evaporator 17.

As a result, the cooling water cooled by the cooling-water-side evaporator 17 can be circulated by the low-temperature-side pump 31 to both the battery heat exchanger 33 and the low-temperature-side radiator 32.

In the present embodiment, the low-temperature-side reserve tank 34 is arranged in the cooling water passage from the low-temperature-side first confluence 30e to the low-temperature-side first branch 30d via the cooling-water-side evaporator 17.

As a result, the cooling water flowing through each of the cooling-water-side evaporator 17, the battery heat exchanger 33, and the low-temperature-side radiator 32t can be separated between gas and liquid at the low-temperature-side reserve tank 34.

In the present embodiment, the controller 60 operates the low-temperature-side pump 31 when the battery 2 is heated by the battery heat exchanger 33. According to this, it is possible to restrict the temperature of the battery 2 from rising sharply when the cooling water whose heat is radiated by the condenser 12 flows into the battery heat exchanger 33.

In the present embodiment, the high-temperature-side pump 21 is arranged in the heat medium passage from the high-temperature-side second confluence 20h to the high-temperature-side first branch 20d via the condenser 12.

As a result, the high-temperature-side pump 21 can circulate the heat medium to all of the high-temperature-side radiator 23, the heater core 22, and the battery heat exchanger 33.

In the present embodiment, the controller 60 operates the high-temperature-side pump 21 after operating the low-temperature-side pump 31 when the battery 2 is heated by the battery heat exchanger 33. According to this, it is possible to surely suppress a sudden rise in the temperature of the battery 2 when the heat medium radiated by the condenser 12 flows into the battery heat exchanger 33.

In the present embodiment, when the controller 60 finishes heating the battery 2 in the battery heat exchanger 33, the high-temperature-side pump 21 is stopped and then the low-temperature-side pump 31 is stopped. According to this, it is possible to restrict the temperature of the battery 2 from rising sharply.

In the present embodiment, when the controller 60 starts heating the battery 2 and heating the cabin, the high-temperature-side four-way valve 26 is controlled to allow the cooling water radiated by the condenser 12 to flow through the battery heat exchanger 33, and the high-temperature-side four-way valve 26 is controlled so that the cooling water does not flow to the heater core 22. Then, when the temperature of the battery 2 reaches a predetermined temperature, the controller 60 controls the high-temperature-side four-way valve 26 so that the cooling water flows through the heater core 22. As a result, the battery 2 can be heated to a predetermined temperature as soon as possible.

In the present embodiment, when the cooling water is injected, the controller 60 controls the high-temperature-side four-way valve 26 to open the cooling water passage on the battery heat exchanger 33 side, the cooling water passage on the high-temperature-side radiator 23 side, and the cooling water passage on the heater core 22 side.

As a result, the cooling water can be injected so as to be distributed as much as possible. Thus, it is possible to suppress the formation of air pools in the passage for the cooling water.

In the present embodiment, when removing air contained in the cooling water, the controller 60 controls the high-temperature-side four-way valve 26 to open one by one in order of the cooling water passage on the battery heat exchanger 33 side, the cooling water passage on the high-temperature-side radiator 23 side, and the cooling water flow on the heater core 22 side.

As a result, the flow rate of the cooling water can be increased as much as possible for each cooling water passage, so that the air contained in the cooling water can be reliably removed.

In the present embodiment, the controller 60 controls the high-temperature-side four-way valve 26 to open the cooling water passage on the battery heat exchanger 33 side, the cooling water passage on the low-temperature-side radiator 32 side, and the cooling-water-side evaporator 17 side one by one in this order when the air contained in the cooling water is removed.

As a result, the flow rate of the cooling water can be increased as much as possible for each cooling water passage, so that the air contained in the cooling water can be reliably removed.

Second Embodiment

Figure 20:
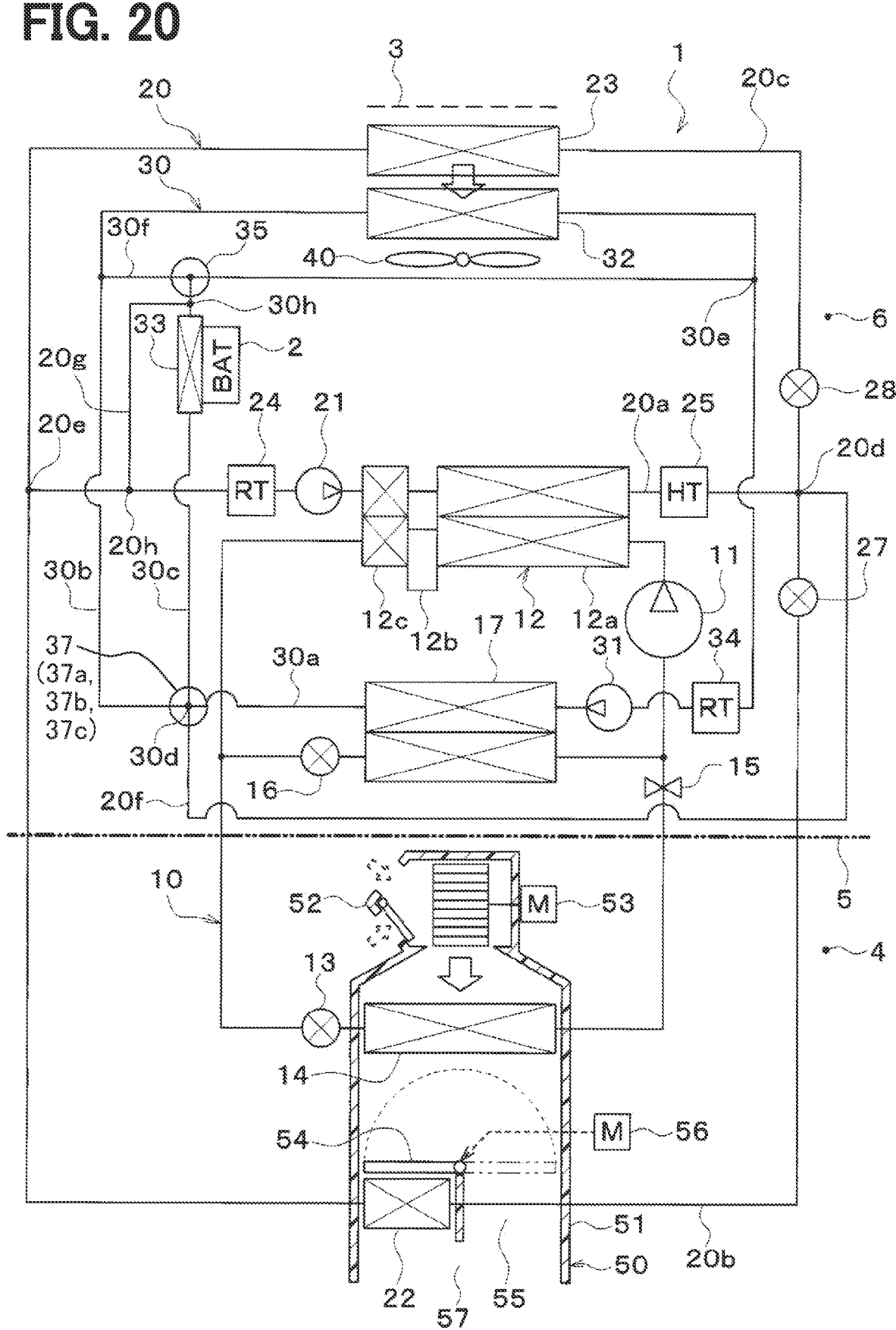
FIG. 20 is an overall configuration diagram of a vehicle temperature control device according to a second embodiment.

In contrast to the first embodiment in which the high-temperature-side four-way valve 26 is arranged in the high-temperature cooling water circuit 20, and the three-way valve 35 and the flow rate adjusting valve 36 are arranged in the low-temperature cooling water circuit 30, according to the present embodiment, as shown in FIG. 20, a heater core side flow rate adjusting valve 27 and a radiator side flow rate adjusting valve 28 are arranged in the high-temperature cooling water circuit 20, and a three-way valve 35 and a low-temperature-side four-way valve 37 are arranged in the low-temperature cooling water circuit 30.

The heater core side flow rate adjusting valve 27, the radiator side flow rate adjusting valve 28, and the low-temperature-side four-way valve 37 are solenoid valves.

The heater core side flow rate adjusting valve 27 is arranged in the heater core passage 20b. The heater core side flow rate adjusting valve 27 opens and closes the heater core passage 20b. The heater core side flow rate adjusting valve 27 adjusts the opening area of the heater core passage 20b.

The radiator side flow rate adjusting valve 28 is arranged in the high-temperature-side radiator passage 20c. The radiator side flow rate adjusting valve 28 opens and closes the high-temperature-side radiator passage 20c. The radiator side flow rate adjusting valve 28 adjusts the opening area of the high-temperature-side radiator passage 20c.

The three-way valve 35 is arranged at the connection between the battery passage 30c and the battery radiator passage 30f, as in the above embodiment.

The low-temperature-side four-way valve 37 is arranged at the low-temperature-side first branch 30d. The low-temperature-side four-way valve 37 opens and closes the evaporator passage 30a, the low-temperature-side radiator passage 30b, and the battery inlet side passage 20f. The low-temperature-side four-way valve 37 adjusts the opening areas of the evaporator passage 30a and the low-temperature-side radiator passage 30b.

The low-temperature-side four-way valve 37 has a low-temperature-side switching unit 37a that switches the cooling water whose heat is absorbed in the cooling-water-side evaporator 17 to flow through the battery heat exchanger 33 or not. The low-temperature-side four-way valve 37 has a low-temperature-side radiator flow rate reducing part 37b that reduces the flow rate of the cooling water flowing through the low-temperature-side radiator 32. The low-temperature-side four-way valve 37 has an evaporator flow ratio reducing part 37c that reduces a ratio of the flow rate of the cooling water flowing through the cooling-water-side evaporator 17 relative to the flow rate of the cooling water whose heat is absorbed in the cooling-water-side evaporator 17.

The low-temperature-side four-way valve 37 is one valve device that opens and closes the cooling water passage on the battery heat exchanger 33 side, and adjusts the opening degree of the cooling water passage on the low-temperature-side radiator 32 side and the opening degree of the cooling water passage on the cooling-water-side evaporator 17 side.

The operation of the heater core side flow rate adjusting valve 27, the radiator side flow rate adjusting valve 28, the three-way valve 35, and the low-temperature-side four-way valve 37 is controlled by the controller 60.

In the cooling/battery cooling mode, the controller 60 controls the heater core side flow rate adjusting valve 27 so that the heater core passage 20b is closed, and controls the radiator side flow rate adjusting valve 28 so that the high-temperature-side radiator passage 20c is opened.

In the cooling/battery cooling mode, the controller 60 controls the low-temperature-side four-way valve 37 so that the evaporator passage 30a is opened, the low-temperature-side radiator passage 30b is closed, and the battery inlet side passage 20f is closed.

In the cooling/battery cooling mode, the controller 60 controls the three-way valve 35 so that the battery passage 30c is opened and the battery radiator passage 30f is closed.

Figure 21:
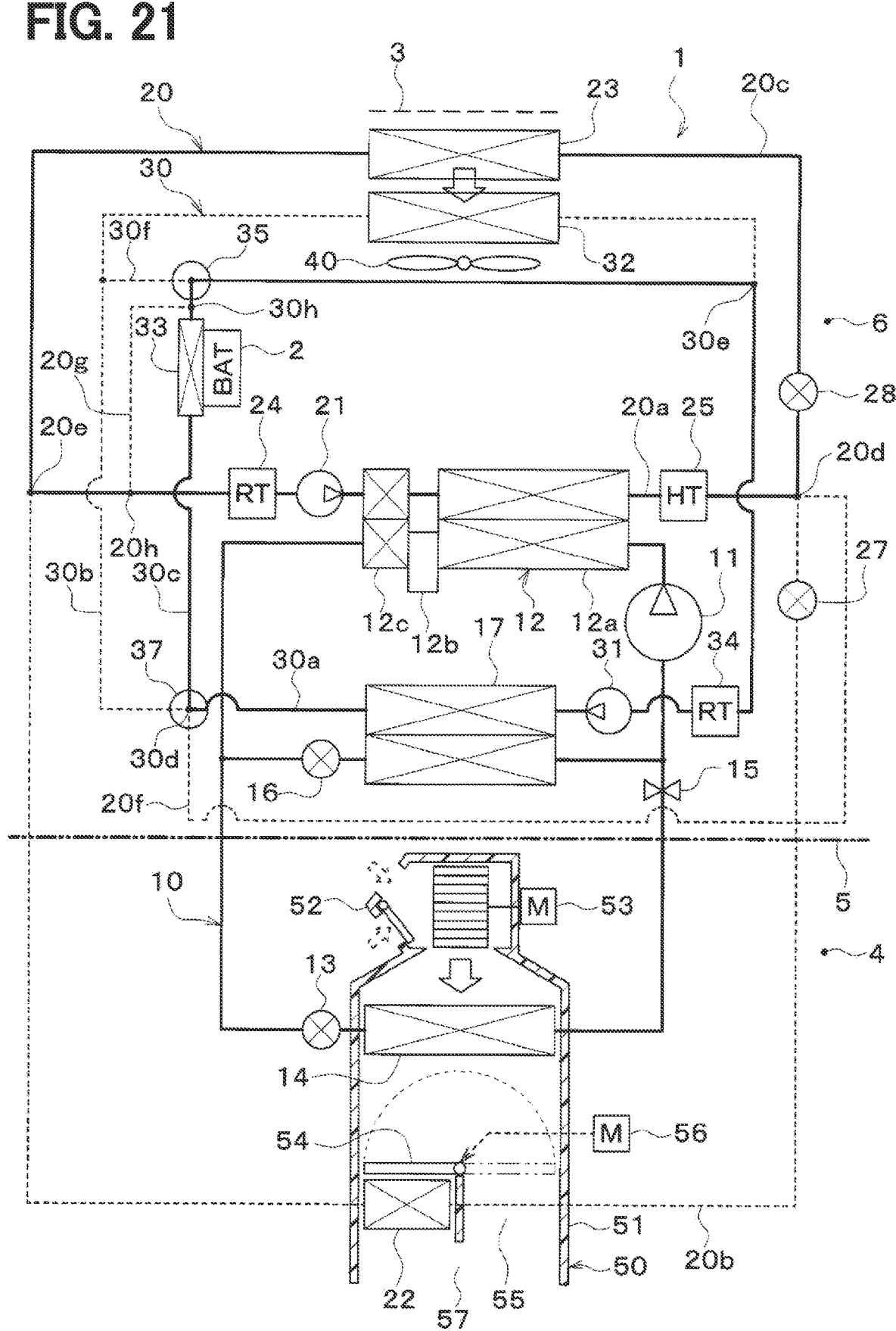
FIG. 21 is an overall configuration diagram illustrating an operating state of the vehicle temperature control device according to the second embodiment in a cooling/battery cooling mode.

As a result, in the low-temperature cooling water circuit 30 in the cooling/battery cooling mode, as shown by the thick solid line in FIG. 21, the cooling water circulates in the battery heat exchanger 33 to cool the battery 2.

In the high-temperature cooling water circuit 20 in the cooling/battery cooling mode, as shown by the thick solid line in FIG. 21, the cooling water of the high-temperature cooling water circuit 20 circulates in the high-temperature-side radiator 23, and the heat of the cooling water is emitted at the high-temperature-side radiator 23 to the outside air.

In the heating mode, the controller 60 controls the heater core side flow rate adjusting valve 27 so that the heater core passage 20b is opened, and controls the radiator side flow rate adjusting valve 28 so that the high-temperature-side radiator passage 20c is closed.

In the heating mode, the controller 60 controls the low-temperature-side four-way valve 37 so that the evaporator passage 30a is opened, the low-temperature-side radiator passage 30b is opened, and the battery inlet side passage 20f is closed.

In the heating mode, the controller 60 controls the three-way valve 35 so that the battery passage 30c is closed and the battery radiator passage 30f is closed.

Figure 22:
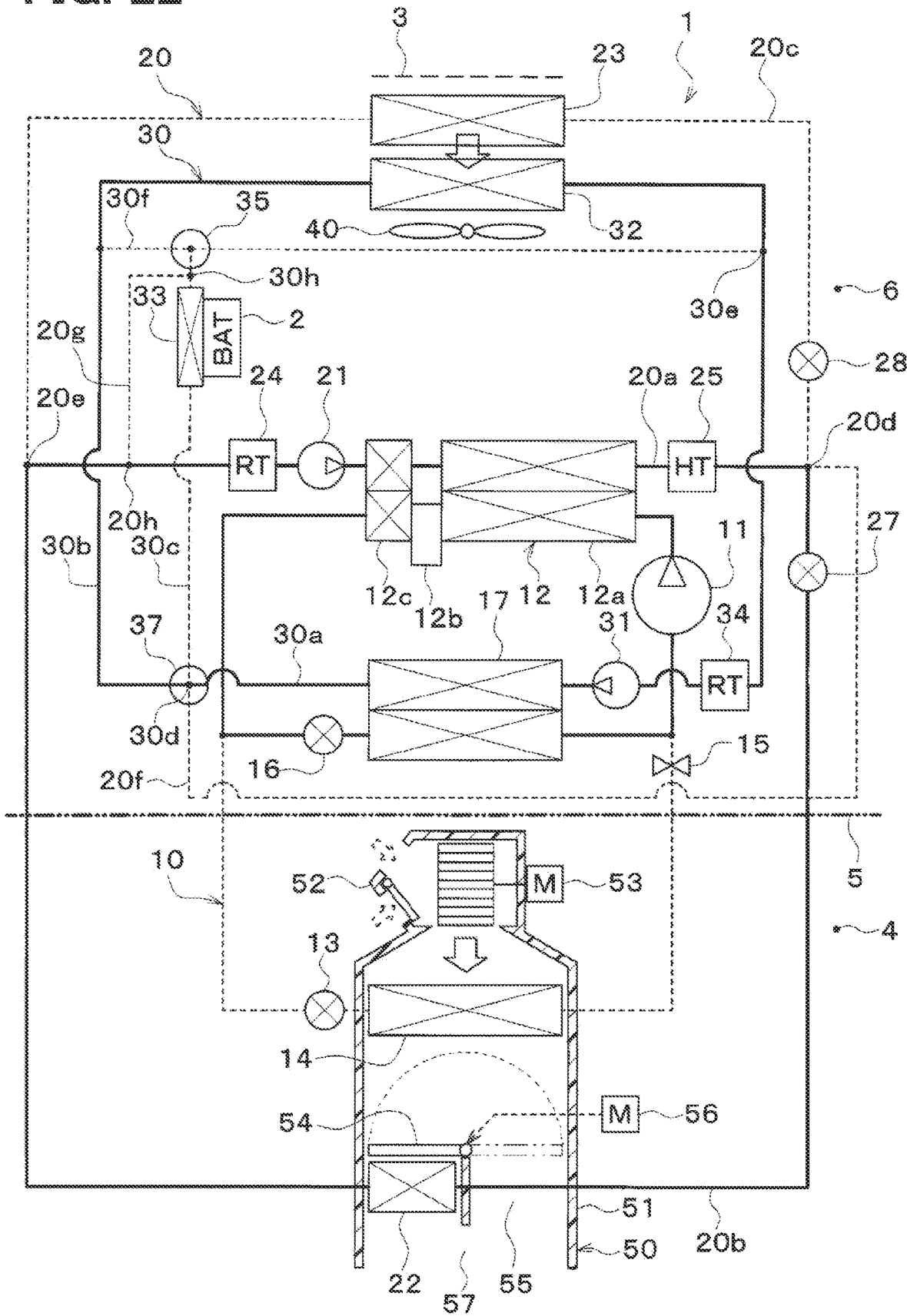
FIG. 22 is an overall configuration diagram illustrating an operating state of the vehicle temperature control device according to the second embodiment in a heating mode.

As a result, in the low-temperature cooling water circuit 30 in the heating mode, as shown by the thick solid line in FIG. 22, the cooling water circulates in the low-temperature-side radiator 32, and the cooling water absorbs heat from the outside air.

In the high-temperature cooling water circuit 20 in the heating mode, as shown by the thick solid line in FIG. 22, the cooling water of the high-temperature cooling water circuit 20 circulates in the heater core 22, and emits heat to the air blown into the cabin at the heater core 22. In this manner, the cabin can be heated.

When the amount of heat absorbed by the cooling water from the outside air is insufficient with respect to the amount of heat required for heating the cabin, the amount of heat can be supplemented by operating the electric heater 25.

In the dehumidifying heating mode, the controller 60 controls the heater core side flow rate adjusting valve 27 so that the heater core passage 20b is opened, and controls the radiator side flow rate adjusting valve 28 so that the high-temperature-side radiator passage 20c is opened.

In the dehumidifying heating mode, the controller 60 controls the low-temperature-side four-way valve 37 so that the battery inlet side passage 20f is closed.

When it is necessary to cool the battery 2 in the dehumidifying heating mode, the controller 60 opens the second expansion valve 16 at the throttle opening, and controls the low-temperature-side pump 31 and the low-temperature-side four-way valve 37 such that the cooling water of the low-temperature cooling water circuit 30 circulates between the cooling-water-side evaporator 17 and the battery heat exchanger 33.

Figure 23:
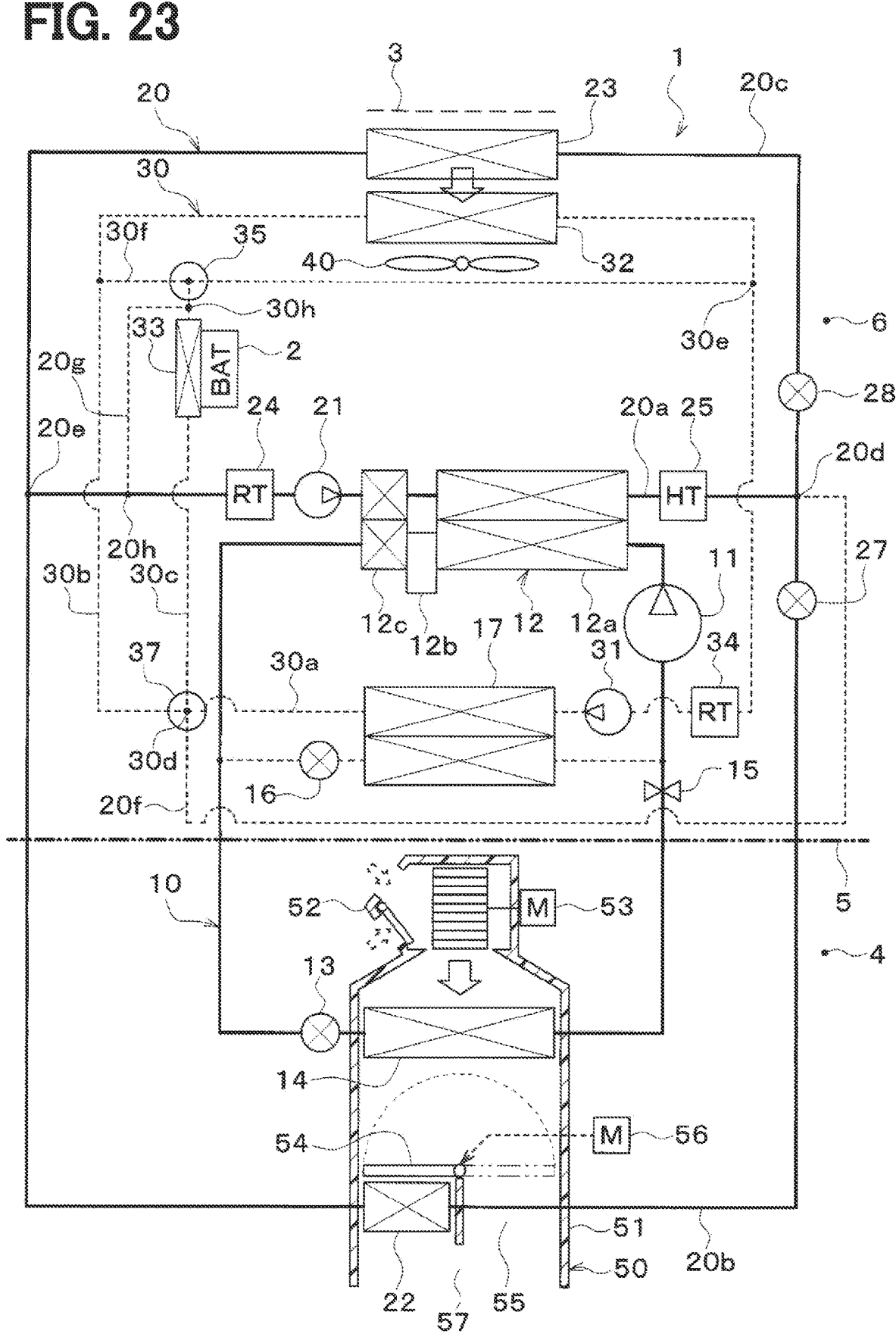
FIG. 23 is an overall configuration diagram illustrating an operating state of the vehicle temperature control device according to the second embodiment in a dehumidifying heating mode.

As a result, in the high-temperature cooling water circuit 20 in the dehumidifying heating mode, the cooling water of the high-temperature cooling water circuit 20 circulates in the heater core 22 as shown by the thick solid line in FIG. 23.

At the same time, in the high-temperature cooling water circuit 20 in the dehumidifying heating mode, as shown by the thick solid line in FIG. 23, the cooling water circulates in the high-temperature-side radiator 23, and the heat is emitted to the outside air. As a result, the cabin can be dehumidified and heated.

In the battery outside air cooling mode, the controller 60 controls the low-temperature-side four-way valve 37 so that the evaporator passage 30a is opened, the low-temperature-side radiator passage 30b is closed, and the battery inlet side passage 20f is closed.

In the battery outside air cooling mode, the controller 60 controls the three-way valve 35 so that the battery passage 30c is closed and the battery radiator passage 30f is opened.

Figure 24:
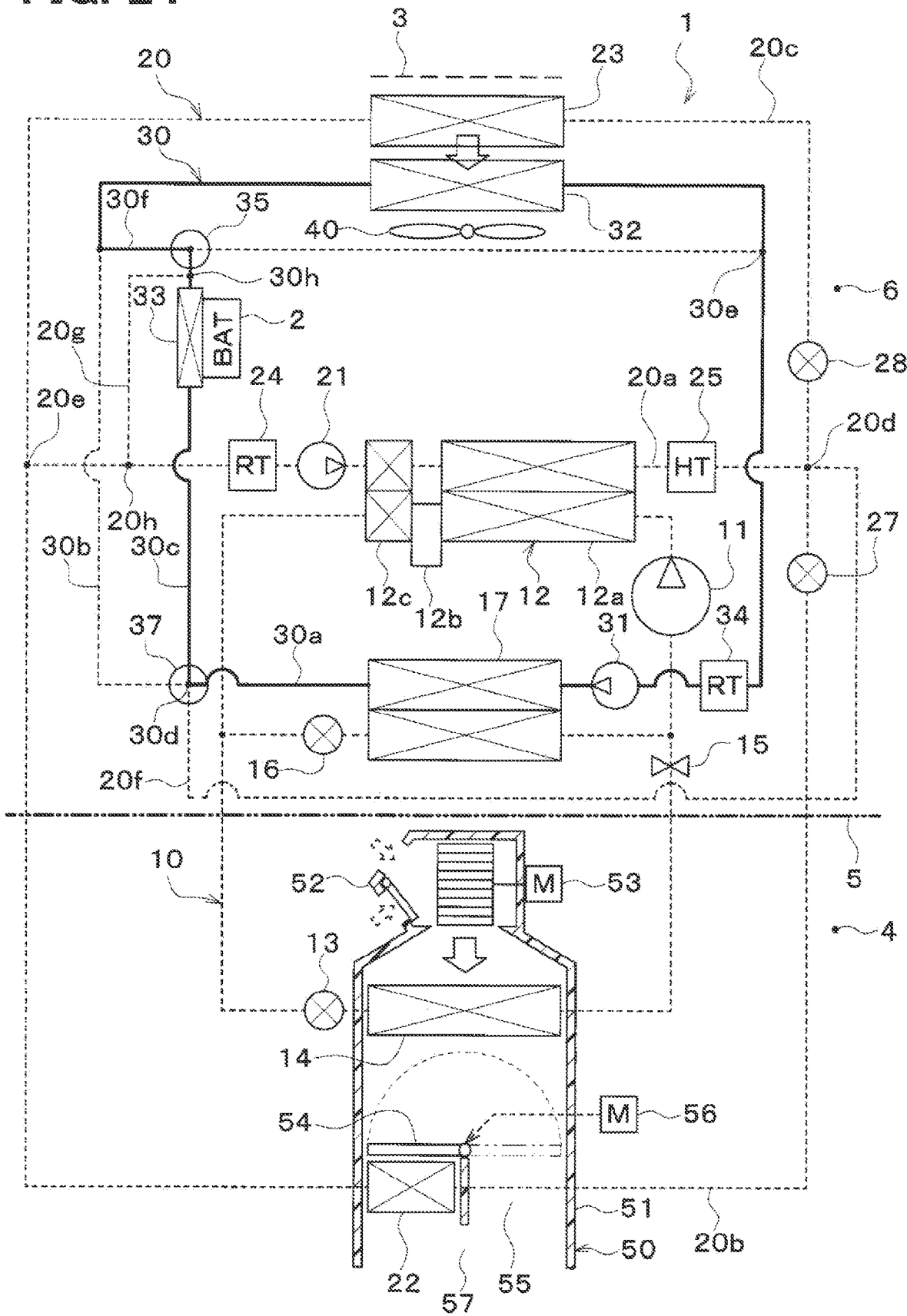
FIG. 24 is an overall configuration diagram illustrating an operating state of the vehicle temperature control device according to the second embodiment in a battery outside air cooling mode.

As a result, in the low-temperature cooling water circuit 30 in the battery outside air cooling mode, the cooling water circulates in the low-temperature-side radiator 32 and the battery heat exchanger 33 as shown by the thick solid line in FIG. 24. The cooling water is cooled by the outside air in the low-temperature-side radiator 32, and the battery 2 is cooled by the cooling water cooled by the low-temperature-side radiator 32.

In the battery heating mode, the controller 60 controls the heater core side flow rate adjusting valve 27 so that the heater core passage 20b is closed, and controls the radiator side flow rate adjusting valve 28 so that the high-temperature-side radiator passage 20c is closed.

In the battery heating mode, the controller 60 controls the high-temperature-side four-way valve 26 so that the evaporator passage 30a is closed, the low-temperature-side radiator passage 30b is closed, and the battery inlet side passage 20f is opened.

In the battery heating mode, the controller 60 controls the three-way valve 35 so that the battery passage 30c is closed and the battery radiator passage 30f is closed.

Figure 25:
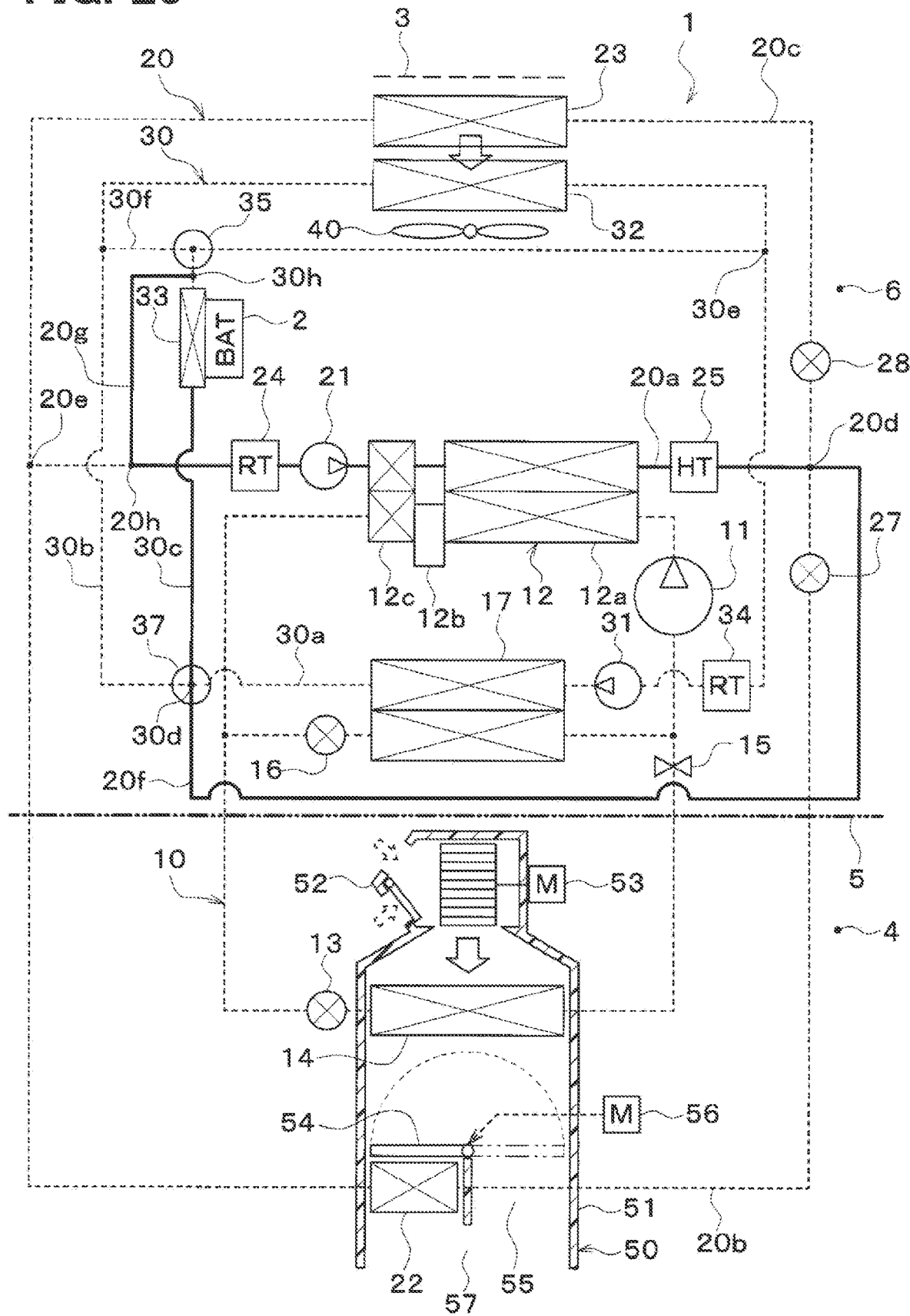
FIG. 25 is an overall configuration diagram illustrating an operating state of the vehicle temperature control device according to the second embodiment in a battery heating mode.

In the high-temperature cooling water circuit 20 and the low-temperature cooling water circuit 30 in the battery heating mode, the cooling water circulates in the electric heater 25 and the battery heat exchanger 33 as shown by the thick solid line in FIG. 25. The cooling water is heated by the electric heater 25, and the battery 2 is heated by the cooling water heated by the electric heater 25.

In the water injection mode, the controller 60 controls the heater core side flow rate adjusting valve 27 so that the heater core passage 20b is opened, and controls the radiator side flow rate adjusting valve 28 so that the high-temperature-side radiator passage 20c is opened.

In the water injection mode, the controller 60 controls the low-temperature-side four-way valve 37 so that the evaporator passage 30a is opened, the low-temperature-side radiator passage 30b is opened, and the battery inlet side passage 20f is opened.

In the water injection mode, the controller 60 controls the three-way valve 35 so that the battery passage 30c is opened and the battery radiator passage 30f is opened.

In the air bleeding mode, the controller 60 controls the heater core side flow rate adjusting valve 27 and the radiator side flow rate adjusting valve 28 so that the high-temperature cooling water circuit 20 is switched in order of the battery outside air cooling mode circuit, the heating mode circuit, and the battery heating mode at a predetermined time interval.

In the air bleeding mode, the controller 60 controls the three-way valve 35 and the low-temperature-side four-way valve 37 so that the low-temperature cooling water circuit 30 switches in order of the heating mode, the battery outside air cooling mode, and the cooling/battery cooling mode at a predetermined time interval.

As a result, the same effect as that of the first embodiment can be obtained.

In the present embodiment, the low-temperature-side four-way valve 37 is arranged in the cooling water passage from the low-temperature-side first branch 30d, through the cooling-water-side evaporator 17 to the low-temperature-side first confluence 30e, to reduce the flow rate of the cooling water flowing through the cooling-water-side evaporator 17.

As a result, when the cooling water whose heat is radiated by the condenser 12 is passed through the battery heat exchanger 33 to heat the battery 2, the heat loss in the cooling-water-side evaporator 17 can be reduced, so that the battery 2 is efficiently heated.

In the present embodiment, the low-temperature-side four-way valve 37 is one valve device that opens and closes the cooling water passage on the battery heat exchanger 33 side and adjusts the opening degree of the cooling water passage on the low-temperature-side radiator 32 side. This makes it possible to simplify the configuration of the low-temperature cooling water circuit 30.

In the present embodiment, the low-temperature-side four-way valve 37 is one valve device that opens and closes the cooling water passage on the battery heat exchanger 33 side and adjusts the opening degree of the cooling water passage on the cooling-water-side evaporator 17 side. This makes it possible to simplify the configuration of the low-temperature cooling water circuit 30.

Third Embodiment

Figure 26:
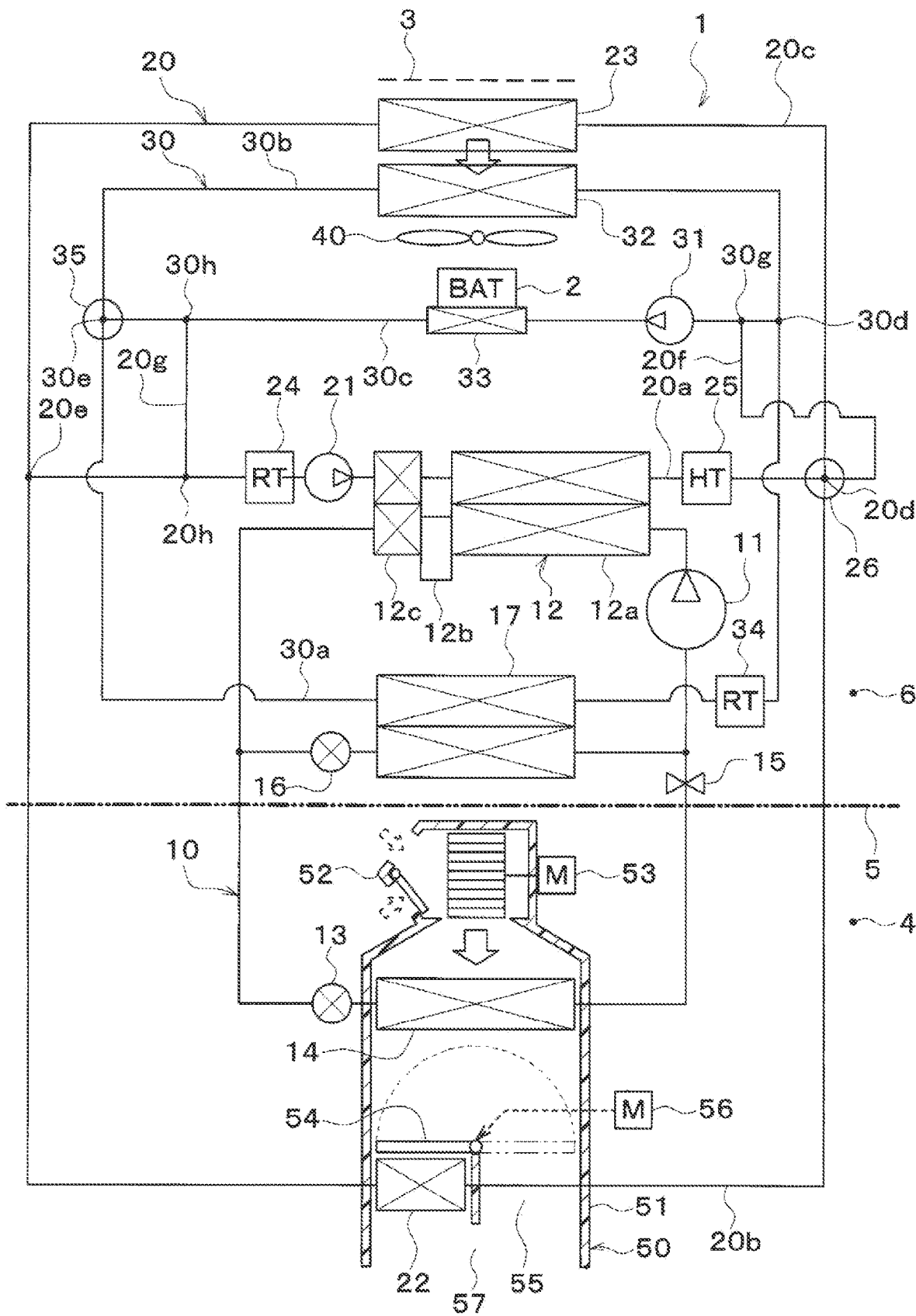
FIG. 26 is an overall configuration diagram of a vehicle temperature control device according to a third embodiment.

In the above embodiment, the low-temperature-side pump 31 is arranged in the evaporator passage 30a, but in this embodiment, as shown in FIG. 26, the low-temperature-side pump 31 is arranged in the battery passage 30c.

In the present embodiment, the battery radiator passage 30f is not provided, and the three-way valve 35 is arranged at the low-temperature-side first confluence 30e.

The three-way valve 35 switches the cooling water flowing out of the battery heat exchanger 33 to flow into the evaporator passage 30a or the low-temperature-side radiator passage 30b.

The cooling water circuit is simplified in this embodiment to mainly cool the battery 2. This embodiment is an effective system in an area where the frequency of heating by absorbing heat from outside air is low.

In the present embodiment, the low-temperature-side pump 31 is arranged in the cooling water passage from the low-temperature-side second confluence 30g, through the battery heat exchanger 33, to the low-temperature-side second branch 30h.

Thereby, the cooling water flowing through the battery heat exchanger 33 can be circulated by the low-temperature-side pump 31 to one or both of the cooling-water-side evaporator 17 and the low-temperature-side radiator 32.

Fourth Embodiment

Figure 27:
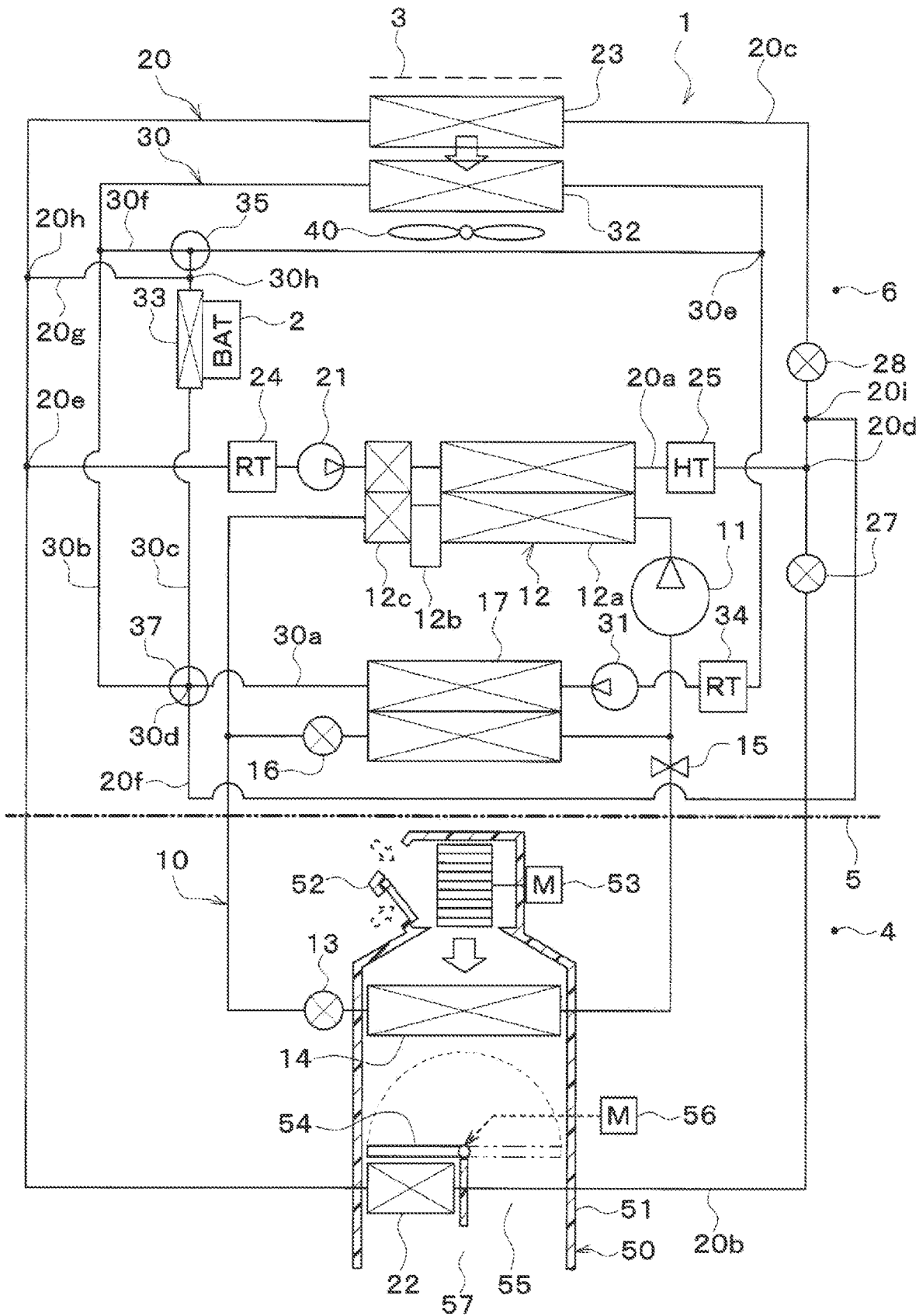
FIG. 27 is an overall configuration diagram of a vehicle temperature control device according to a fourth embodiment.

In the second embodiment, the battery inlet side passage 20f is connected to the high-temperature cooling water circuit 20 at the high-temperature-side first branch 20d. In contrast, in the present embodiment, as shown in FIG. 27, the battery inlet side passage 20f is connected to the high-temperature cooling water circuit 20 at the high-temperature-side second branch 20i.

The high-temperature-side second branch 20i is arranged in the high-temperature-side radiator passage 20c at the cooling water inlet side of the high-temperature-side radiator 23.

In the second embodiment, the high-temperature-side second confluence 20h is arranged in the condenser passage 20a at the cooling water inlet side of the high-temperature-side reserve tank 24. In the present embodiment, as shown in FIG. 27, the high-temperature-side second confluence 20h is arranged in the high-temperature-side radiator passage 20c at the cooling water outlet side of the high-temperature-side radiator 23.

The heater core side flow rate adjusting valve 27 is arranged in a cooling water passage from the high-temperature-side first branch 20d to the high-temperature-side first confluence 20e via the heater core 22.

The radiator side flow rate adjusting valve 28 is arranged in the cooling water passage from the high-temperature-side second branch 20*i* to the high-temperature-side second confluence 20*h* via the high-temperature-side radiator 23.

Also in this embodiment, the same effects as those in the second embodiment can be obtained.

Fifth Embodiment

Figure 28:
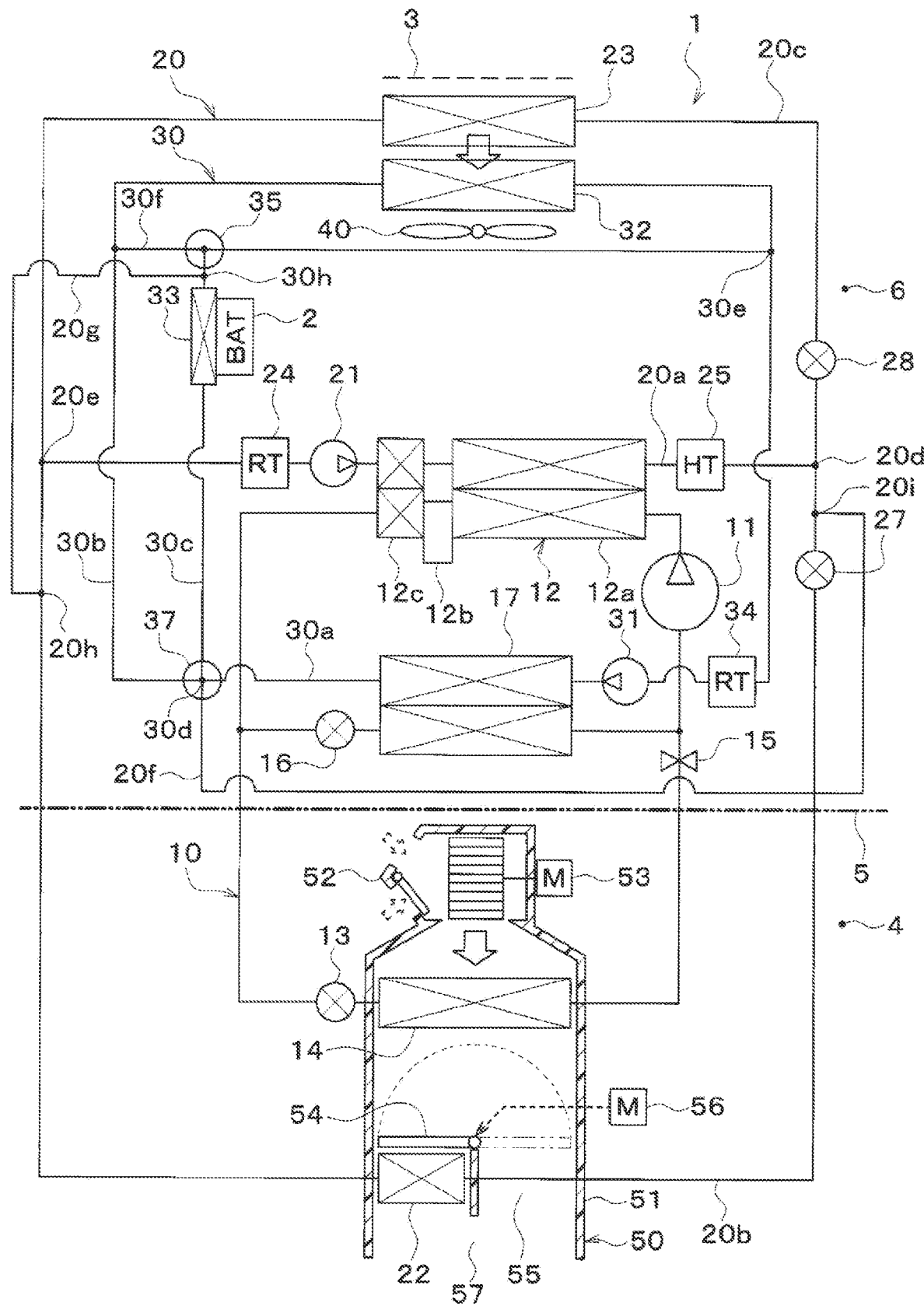
FIG. 28 is an overall configuration diagram of a vehicle temperature control device according to a fifth embodiment.

In the fourth embodiment, the high-temperature-side second branch 20*i* is arranged in the high-temperature-side radiator passage 20*c* at the cooling water inlet side of the high-temperature-side radiator 23. As shown in FIG. 28, in the present embodiment, the high-temperature-side second branch 20*i* is arranged in the heater core passage 20*b* at the cooling water inlet side of the heater core 22.

In the fourth embodiment, the high-temperature-side second confluence 20*h* is arranged in the high-temperature-side radiator passage 20*c* at the cooling water inlet side of the high-temperature-side radiator 23. As shown in FIG. 28, in the present embodiment, the high-temperature-side second confluence 20*h* is arranged in the heater core passage 20*b* at the cooling water outlet side of the heater core 22.

The heater core side flow rate adjusting valve 27 is arranged in the cooling water passage from the high-temperature-side second branch 20*i* to the high-temperature-side second confluence 20*h* via the heater core 22.

The radiator-side flow rate adjusting valve 28 is arranged in the cooling water passage from the high-temperature-side first branch 20*d*, through the high-temperature-side radiator 23, to the high-temperature-side first confluence 20*e*.

Also in this embodiment, the same effects as those in the fourth embodiment can be obtained.

Sixth Embodiment

Figure 29:
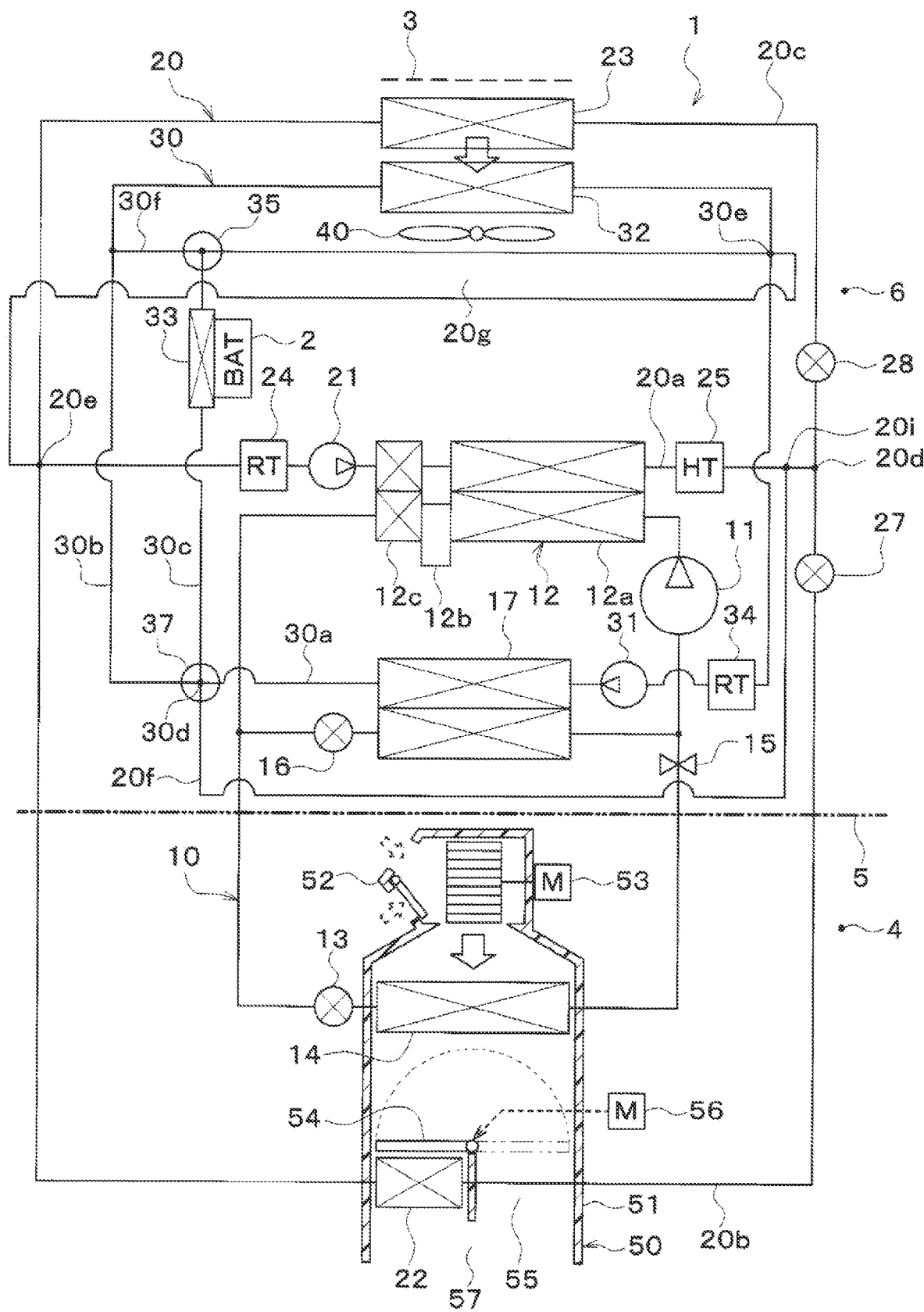
FIG. 29 is an overall configuration diagram of a vehicle temperature control device according to a sixth embodiment.

In the fourth embodiment, the high-temperature-side second branch 20*i* is arranged in the high-temperature-side radiator passage 20*c* at the cooling water inlet side of the high-temperature-side radiator 23. As shown in FIG. 29, in the present embodiment, the high-temperature-side second branch 20*i* is arranged in the condenser passage 20*a* at the cooling water outlet side of the electric heater 25.

In the fourth embodiment, the battery outlet side passage 20*g* is connected to the low-temperature-side second branch 30*h* and the high-temperature-side second confluence 20*h*. In the present embodiment, as shown in FIG. 29, the battery outlet side passage 20*g* is connected to the low-temperature-side first confluence 30*e* and the high-temperature-side first confluence 20*e*.

The heater core side flow rate adjusting valve 27 is arranged in the cooling water passage from the high-temperature-side first branch 20*d* to the high-temperature-side first confluence 20*e* via the heater core 22.

The radiator-side flow rate adjusting valve 28 is arranged in the cooling water passage from the high-temperature-side first branch 20*d*, through the high-temperature-side radiator 23, to the high-temperature-side first confluence 20*e*.

Also in this embodiment, the same effects as those in the fourth embodiment can be obtained.

The present disclosure is not limited to the embodiments described above, and various modifications can be made as follows within a range not departing from the spirit of the present disclosure.

In the first embodiment, the low-temperature-side second confluence 30*g* is arranged in the battery passage 30*c* at the cooling water inlet side of the battery heat exchanger 33, and the low-temperature-side second branch 30*h* is arranged in the battery passage 30*c* at the cooling water outlet side of the battery heat exchanger 33.

In contrast, the low-temperature-side second confluence 30*g* is arranged in the low-temperature-side radiator passage 30*b* at the cooling water inlet side of the low-temperature-side radiator 32, and the low-temperature-side second branch 30*h* is arranged in the low-temperature-side radiator passage 30*b* at the cooling water outlet side of the low-temperature-side radiator 32.

In this case, the flow rate adjusting valve 36 may be arranged in the cooling water passage from the low-temperature-side second confluence 30*g* to the low-temperature-side second branch 30*h* via the low-temperature-side radiator 32.

In the first embodiment, the low-temperature-side second confluence 30*g* is arranged in the battery passage 30*c* at the cooling water inlet side of the battery heat exchanger 33, and the low-temperature-side second branch 30*h* is arranged in the battery passage 30*c* at the cooling water outlet side of the battery heat exchanger 33.

In contrast, the low-temperature-side second confluence 30*g* is arranged in the evaporator passage 30*a* at the cooling water outlet side of the cooling-water-side evaporator 17, and the low-temperature-side second branch 30*h* is arranged in the evaporator passage 30*a* at the cooling water inlet side of the low-temperature-side reserve tank 34.

In this case, the flow rate adjusting valve 36 may be arranged in the cooling water passage from the low-temperature-side first branch 30*d* to the evaporator passage 30*a* and the low-temperature-side first confluence 30*e*.

In the above embodiment, cooling water is used as the heating medium, but various media such as oil may be used as the heating medium. A nanofluid may be used as the heating medium. The nanofluid is fluid in which nanoparticles of the order of nanometers in diameter are mixed.

In the refrigeration cycle device 10, a fluorocarbon refrigerant is used as the refrigerant, but the type of the refrigerant is not limited to this, and a natural refrigerant such as carbon dioxide or a hydrocarbon refrigerant may be used.

The refrigeration cycle device 10 configures a subcritical refrigeration cycle in which a high-pressure side refrigerant pressure does not exceed the critical pressure of the refrigerant, but may configure a supercritical refrigeration cycle in which the high-pressure side refrigerant pressure exceeds the critical pressure of the refrigerant.

In the above embodiment, the high-temperature-side radiator 23 and the low-temperature-side radiator 32 are separate radiators, but the high-temperature-side radiator 23 and the low-temperature-side radiator 32 may be composed of one radiator.

For example, the cooling water tank of the high-temperature-side radiator 23 and the cooling water tank of the low-temperature-side radiator 32 may be integrated with each other, whereby the high-temperature-side radiator 23 and the low-temperature-side radiator 32 are constituted as one radiator.

The high-temperature-side radiator 23 and the low-temperature-side radiator 32 may be a common one radiator, whereby the cooling water of the high-temperature cooling water circuit 20 and the cooling water of the low-temperature cooling water circuit 30 may be switched for being introduced into the common radiator. The cooling water of the high-temperature cooling water circuit 20 and the cooling water of the low-temperature cooling water circuit 30 may be introduced into one common radiator at an arbitrary flow rate.

The switching of the introduced cooling water and the regulation of the ratio of the flow rates can be performed using an on-off valve or flow rate regulation valve of the cooling water passage.

In-vehicle devices such as a transaxle, a motor generator, and an inverter that require cooling may be arranged in the low-temperature cooling water circuit 30.

In the above embodiment, the vehicle temperature control device 1 is applied to the electric vehicle, but the vehicle temperature control device 1 may be applied to a hybrid vehicle that obtains driving force from an internal combustion engine and an electric motor.

Although the present disclosure has been described in accordance with embodiments, it is understood that the present disclosure is not limited to such embodiments or structures. The present disclosure encompasses various modifications and variations within the scope of equivalents. In addition, while the various combinations and configurations, which are preferred, other combinations and configurations, including more, less or only a single element, are also within the spirit and scope of the present disclosure.

What is claimed is:

1. A battery heating device for a vehicle comprising:
   a compressor configured to draw a refrigerant and to discharge the refrigerant after compressing the refrigerant;
   a heat emitter configured to emit heat of the refrigerant discharged from the compressor to a heat medium;
   a decompressor configured to decompress the refrigerant flowing from the heat emitter;
   an evaporator configured to evaporate the refrigerant decompressed by the decompressor;
   a high-temperature-side radiator configured to radiate heat of the heat medium to outside air;
   a heater core arranged in parallel with the high-temperature-side radiator in a flow of the heat medium so as to heat air to be sent into a cabin by exchanging heat between the air and the heat medium;
   a battery temperature adjusting unit configured to heat a battery with the heat medium;
   a high-temperature-side first branch for the heat medium whose heat is emitted in the heat emitter to branch between the high-temperature-side radiator and the heater core;
   a high-temperature-side first confluence where the heat medium flowing through the high-temperature-side radiator and the heat medium flowing through the heater core merge toward the heat emitter;
   a high-temperature-side second branch for the heat medium whose heat is emitted in the heat emitter to branch to the battery temperature adjusting unit;
   a high-temperature-side second confluence where the heat medium flowing through the battery temperature adjusting unit merges toward the heat emitter;
   a high-temperature-side switching unit configured to switch the heat medium whose heat is emitted in the heat emitter to flow through the battery temperature adjusting unit or not; and
   a high-temperature-side radiator flow ratio reducing part arranged in a heat medium passage from the high-temperature-side first branch or the high-temperature-side second branch closer to the high-temperature-side radiator, through the high-temperature-side radiator, to the high-temperature-side first confluence or the high-temperature-side second confluence closer to the high-temperature-side radiator so as to reduce a ratio of a flow rate of the heat medium flowing through the high-temperature-side radiator relative to a flow rate of the heat medium whose heat is emitted in the heat emitter,
   wherein the evaporator causes s the refrigerant decompressed by the decompressor to absorb heat from the heat medium to evaporate the refrigerant, the battery heating device further comprising:
   a low-temperature-side radiator arranged in parallel with the battery temperature adjusting unit in a flow of the heat medium whose heat is absorbed by the evaporator so as to exchange heat between the heat medium and outside air;
   a low-temperature-side first branch for the heat medium whose heat is absorbed in the evaporator to branch between the battery temperature adjusting unit and the low-temperature-side radiator;
   a low-temperature-side first confluence where the heat medium flowing through the battery temperature adjusting unit and the heat medium flowing through the low-temperature-side radiator merge toward the evaporator;
   a low-temperature-side second confluence for the heat medium whose heat is emitted in the heat emitter to merge toward the battery temperature adjusting unit;
   a low-temperature-side second branch for the heat medium flowing through the battery temperature adjusting unit to branch to the heat emitter; and
   a low-temperature-side radiator flow rate reducing part arranged in a heat medium passage from the low-temperature-side first branch or the low-temperature-side second confluence closer to the low-temperature-side radiator, via the low-temperature-side radiator, to the low-temperature-side first confluence or the low-temperature-side second branch closer to the low-temperature-side radiator so as to reduce a flow rate of the heat medium flowing through the low-temperature-side radiator.

2. The battery heating device according to claim 1, further comprising a heater core flow rate reducing part arranged in a heat medium passage from the high-temperature-side first branch or the high-temperature-side second branch closer to the heater core, through the heater core, to the high-temperature-side first confluence or the high-temperature-side second confluence closer to the heater core so as to reduce a flow rate of the heat medium flowing through the heater core.

3. The battery heating device according to claim 2, the high-temperature-side switching unit and the heater core flow rate reducing part are formed of one valve device that opens or closes the heat medium passage for the battery temperature adjusting unit and adjusts an opening degree of the heat medium passage for the heater core.

4. The battery heating device according to claim 2, further comprising:
   a controller configured
   to control the high-temperature-side switching unit so that the heat medium whose heat is emitted in the heat emitter flows through the battery temperature adjusting unit, and to control the heater core flow rate reducing part so that the heat medium does not flow through the heater core, when starting a heating of the battery and a heating of the cabin, and
   to control the heater core flow rate reducing part so that the heat medium flows through the heater core when a temperature of the battery reaches a predetermined temperature.

5. The battery heating device according to claim 1, the high-temperature-side switching unit and the high-temperature-side radiator flow ratio reducing part are formed of one valve device that opens or closes the heat medium passage for the battery temperature adjusting unit and adjusts an opening degree of the heat medium passage for the high-temperature-side radiator.

6. The battery heating device according to claim 1, further comprising a heater provided in a heat medium passage from the high-temperature-side first confluence or the high-temperature-side second confluence closer to the heat emitter, through the heat emitter, to the high-temperature-side first branch or the high-temperature-side second branch closer to the heat emitter so as to generate heat independently of a state of the vehicle.

7. The battery heating device according to claim 1, further comprising a high-temperature-side reserve tank arranged in a heat medium passage from the high-temperature-side first confluence or the high-temperature-side second confluence closer to the heat emitter, through the heat emitter, to the high-temperature-side first branch or the high-temperature-side second branch closer to the heat emitter so as to separate the heat medium between gas and liquid and store the heat medium.

8. The battery heating device according to claim 1, further comprising a high-temperature-side pump arranged in a heat medium passage from the high-temperature-side first confluence or the high-temperature-side second confluence closer to the heat emitter, through the heat emitter, to the high-temperature-side first branch or the high-temperature-side second branch closer to the heat emitter so as to suck and discharge the heat medium.

9. The battery heating device according to claim 1, further comprising a controller configured to control the high-temperature-side switching unit and the high-temperature-side radiator flow ratio reducing part to open the heat medium passage for the battery temperature adjusting unit, the heat medium passage for the high-temperature-side radiator, and the heat medium passage for the heater core when the heat medium is injected.

10. The battery heating device according to claim 1, further comprising a controller configured to control the high-temperature-side switching unit and the high-temperature-side radiator flow ratio reducing part so as to sequentially open the heat medium passage for the battery temperature adjusting unit, the heat medium passage for the high-temperature-side radiator, and the heat medium passage for the heater core in this order when air contained in the heat medium is removed.

11. The battery heating device according to claim 1, further comprising a controller configured to control the high-temperature-side switching unit and the high-temperature-side radiator flow ratio reducing part so as to sequentially open the heat medium passage for the battery temperature adjusting unit, the heat medium passage for the low-temperature-side radiator, and the heat medium passage for the evaporator in this order when air contained in the heat medium is removed.

12. The battery heating device according to claim 1, wherein the battery temperature adjusting unit is formed of a heat exchanger and the low-temperature-side radiator flow rate reducing part is formed of a valve.

13. A battery heating device for a vehicle comprising:
a compressor configured to draw a refrigerant and to discharge the refrigerant after compressing the refrigerant;
a heat emitter configured to emit heat of the refrigerant discharged from the compressor to a heat medium;
a decompressor configured to decompress the refrigerant flowing from the heat emitter;
an evaporator configured to evaporate the refrigerant decompressed by the decompressor;
a high-temperature-side radiator configured to radiate heat of the heat medium to outside air;
a heater core arranged in parallel with the high-temperature-side radiator in a flow of the heat medium so as to heat air to be sent into a cabin by exchanging heat between the air and the heat medium;
a battery temperature adjusting unit configured to heat a battery with the heat medium whose heat is emitted in the heat emitter;
a heat emitter passage through which the heat medium whose heat is emitted in the heat emitter flows;
a heater core passage that branches from the heat emitter passage and allows the heat medium to flow toward the heater core;
a high-temperature-side radiator passage that branches from the heat emitter passage and allows the heat medium to flow toward the high-temperature-side radiator;
a battery inlet side passage that branches from the heat emitter passage and allows the heat medium to flow toward the battery temperature adjusting unit; and
a high-temperature-side four-way valve connected to the heat emitter passage, the heater core passage, the high-temperature-side radiator passage, and the battery inlet side passage so as to control a ratio of a flow rate of the heat medium flowing from the heat emitter passage to the heater core passage, a ratio of a flow rate of the heat medium flowing from the heat emitter passage to the high-temperature-side radiator passage, and a ratio of a flow rate of the heat medium flowing from the heat emitter passage to the battery inlet side passage, relative to a flow rate of the heat medium whose heat is emitted in the heat emitter,
wherein the evaporator causes the refrigerant decompressed by the decompressor to absorb heat from the heat medium to evaporate the refrigerant, the battery heating device further comprising:
a low-temperature-side radiator arranged in parallel with the battery temperature adjusting unit in a flow of the heat medium whose heat is absorbed by the evaporator to exchange heat between the heat medium and outside air;
an evaporator passage through which the heat medium whose heat is absorbed by the evaporator flows;
a low-temperature-side radiator passage that branches from the evaporator passage and allows the heat medium to flow toward the low-temperature-side radiator;
a battery temperature adjusting unit passage that branches from the evaporator passage and allows the heat medium to flow toward the battery temperature adjusting unit; and
a flow rate adjusting valve configured to adjust a flow rate of the heat medium flowing from the evaporator passage to the low-temperature-side radiator passage.

14. The battery heating device according to claim 13, wherein the high-temperature-side four-way valve reduces a flow rate of the heat medium flowing through the high-temperature-side radiator passage.

15. The battery heating device according to claim 13, wherein the high-temperature-side four-way valve reduces a flow rate of the heat medium flowing through the heater core passage.

16. The battery heating device according to claim 13, further comprising a heater arranged between the heat emitter and the high-temperature-side four-way valve in the heat emitter passage so as to generate heat independently of a state of the vehicle.

17. The battery heating device according to claim 13, wherein the battery temperature adjusting unit is formed of a heat exchanger.

* * * * *